US007705894B2

(12) United States Patent
Nakase et al.

(10) Patent No.: US 7,705,894 B2
(45) Date of Patent: Apr. 27, 2010

(54) DATA PROCESSING APPARATUS AND CONTROL METHOD THEREOF WITH UPDATING OF UNIQUE IDENTIFICATION INFORMATION OF A CHANGED RECORDED FILE

(75) Inventors: Yuichi Nakase, Tokyo (JP); Yasuyuki Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 11/843,160

(22) Filed: Aug. 22, 2007

(65) Prior Publication Data
US 2008/0049349 A1 Feb. 28, 2008

(30) Foreign Application Priority Data
Aug. 23, 2006 (JP) ............................. 2006-227021
Aug. 23, 2006 (JP) ............................. 2006-227022

(51) Int. Cl.
*H04N 5/76* (2006.01)
(52) U.S. Cl. ............................. 348/231.3; 348/231.99
(58) Field of Classification Search ............ 348/231.99, 348/231.2, 231.3, 231.5, 231.6
See application file for complete search history.

(56) References Cited

U.S. PATENT DOCUMENTS

| 6,011,547 | A  | * | 1/2000  | Shiota et al. ................. 382/254 |
| 6,273,535 | B1 | * | 8/2001  | Inoue et al. ..................... 347/3 |
| 6,590,608 | B2 | * | 7/2003  | Matsumoto et al. ...... 348/231.2 |
| 6,650,365 | B1 | * | 11/2003 | Sato ......................... 348/231.3 |
| 6,741,864 | B2 | * | 5/2004  | Wilcock et al. .......... 455/456.1 |
| 7,098,943 | B2 | * | 8/2006  | Shibutani ................. 348/211.1 |
| 7,551,210 | B2 | * | 6/2009  | Katayama ................. 348/231.3 |
| 2002/0135687 | A1 | * | 9/2002 | Nakajima et al. ........ 348/231.3 |
| 2003/0011684 | A1 | * | 1/2003 | Narayanaswami et al. ...................... 348/207.99 |
| 2003/0158838 | A1 | * | 8/2003 | Okusa ........................... 707/1 |
| 2004/0061792 | A1 | * | 4/2004 | Ota et al. ................. 348/231.3 |
| 2005/0007462 | A1 |   | 1/2005 | Koizumi |
| 2005/0052559 | A1 |   | 3/2005 | Hayaishi |
| 2006/0029296 | A1 |   | 2/2006 | King et al. |
| 2006/0110153 | A1 |   | 5/2006 | Yanagida et al. |
| 2006/0114514 | A1 |   | 6/2006 | Rothschild |

FOREIGN PATENT DOCUMENTS

| EP | 0 830 088     | 12/1996 |
| JP | 2002-259332   | 9/2002  |
| JP | 2002-259668   | 9/2002  |
| JP | 2002-271672   | 9/2002  |
| JP | 2003-338976   | 11/2003 |
| JP | 2004-112602   | 4/2004  |
| JP | 2006-115062   | 4/2006  |

* cited by examiner

*Primary Examiner*—Kelly L Jerabek
(74) *Attorney, Agent, or Firm*—Cowan, Liebowitz & Latman, P.C.

(57) ABSTRACT

A data recording apparatus holds device state information which is updated according to use of the apparatus and represents a use state of the apparatus, and device identification information unique to the apparatus. Upon recording data, the data recording apparatus acquires information associated with generation of recording data, which is different from the device state information, as recording information, in association with the recording data. The apparatus generates unique identification information of the recording data based on the device identification information, the device state information, and the recording information, and records a file including the recording data and the unique identification information in a recording medium.

5 Claims, 19 Drawing Sheets

FIG. 7

| | FILE NAME | EXTEN-SION | GENER-ATION DATE AND TIME | UPDATE DATE AND TIME | START CLUSTER NUMBER | FILE SIZE |
|---|---|---|---|---|---|---|
| 707 | IMG_0001 | JPG | 2006.01.02 10:40:30 | 2006.01.02 10:40:30 | | 524288 |
| 708 | IMG_0002 | JPG | 2006.01.02 10:50:30 | 2006.01.02 10:50:30 | | 262142 |
| 709 | IMG_0003 | JPG | 2006.01.02 10:50:30 | 2006.03.03 21:20:30 | | 131072 |
| 710 | IMG_0004 | JPG | 2006.04.20 09:10:10 | 2006.04.20 09:10:10 | | 262142 |
| 712 | IMG_0005 | JPG | 2006.04.20 12:20:30 | 2006.04.20 12:20:30 | | 524288 |
| 717 | SND_0005 | WAV | 2006.04.20 12:25:30 | 2006.04.20 12:25:30 | | 56584 |
| 713 | MVI_0005 | AVI | 2006.04.30 09:08:10 | 2006.04.30 09:08:10 | | 524288 |
| 714 | MVI_0005 | THM | 2006.04.30 09:08:10 | 2006.04.30 09:08:10 | | 16384 |
| 715 | MVI_0006 | AVI | 2006.04.30 09:08:10 | 2006.06.06 12:20:30 | | 262142 |
| 716 | MVI_0006 | THM | 2006.04.30 09:08:10 | 2006.06.06 12:20:30 | | 14336 |

701, 702, 703, 704, 705, 706

US 7,705,894 B2

DATA PROCESSING APPARATUS AND CONTROL METHOD THEREOF WITH UPDATING OF UNIQUE IDENTIFICATION INFORMATION OF A CHANGED RECORDED FILE

BACKGROUND OF THE INVENTION

1. Field of the Invention

The present invention relates to a data processing apparatus, and a control method thereof.

2. Description of the Related Art

In general, in a digital camera, shot image data obtained by shooting is assigned a file name according to the rule of DCF (Design rule for Camera File system), for example, a file name IMG_XXXX.jpg (XXXX is a numeral which increments in the shooting order). However, when files named by such a naming rule are copied to and managed by an external device, file names often are not unique. In such a state, when a file is copied to an external device, an old file may be overwritten.

For this reason, a technique for associating unique identification information (to be referred to as unique ID hereinafter) used to specify an image so as to improve image searchability and management between a digital camera and external device to which the digital camera is connected has been proposed. Such association between the image and unique ID is executed on the digital camera side upon recording an image or the like. Japanese Patent Laid-Open No. 2004-112602 has proposed a digital camera which calculates a unique ID based on a file path of data, and manages the data. Also, Japanese Patent Laid-Open No. 2002-259332 has proposed a technique for recording identification information unique to a device in data.

Furthermore, Japanese Patent Laid-Open No. 2002-271672 describes a technique which acquires identification information unique to a device and image information from another electronic device, generates image information that describes the identification information, and outputs that image information. Japanese Patent Laid-Open No. 2002-259668 discloses a technique which generates and outputs an image file which describes an identifier of an electronic device itself, and a technique which generates and outputs an image file that describes an identifier set by the user.

However, since the technique of Japanese Patent Laid-Open No. 2004-112602 calculates a unique ID based on the file path of data, identical data that have different file path configurations will be assigned unique IDs. That is, a plurality of unique IDs may be assigned to identical image information. Since the technique of Japanese Patent Laid-Open No. 2002-259332 associates the unique ID of the device to data, the device can be specified from the data, but the data cannot be uniquely specified.

Furthermore, the technique described in Japanese Patent Laid-Open No. 2002-271672 contemplates setting of the unique ID for image information, but does not contemplate the re-setting of a unique ID for an image that has already been set with the unique ID. For example, when an edit operation is made to change the image contents, if the unique ID is maintained even though the image information has changed, the same unique ID is assigned to different images. Also, when processing such as rotation of an image that does not practically change the image contents is applied, if the unique ID is re-assigned, a plurality of unique IDs are assigned to an identical image. The technique described in Japanese Patent Laid-Open No. 2002-259668 can specify the electronic device but cannot specify an image, and does not assume assignment of unique IDs upon image editing.

Therefore, with the general unique ID assignment method to image information, identical data may be transferred a plurality of times with an external device that manages the holding state of image files recorded in the digital camera. Also, an image file that requires transfer may fail to transfer. As a result, image file management efficiency and reliability of the digital camera and external device are impaired. The same issue applies to still image files, moving image files, or audio files. That is, it is required to prevent identical data from being transferred a plurality of times with an external device which manages the reception state of data files recorded in a recording apparatus using the unique IDs of data files.

SUMMARY OF THE INVENTION

The present invention has been made in consideration of the aforementioned problems, and one feature of the present invention allows assignment of unique identification information that does not cause any duplication to data files.

Another feature of the present invention allows implementation of efficient and highly reliable management that manages the reception state of data files using the unique IDs of the files.

According to one aspect of the present invention, there is provided a data processing apparatus comprising:

holding means configured to hold device state information which is updated according to use of the data processing apparatus and represents a use state of the apparatus, and device identification information unique to the apparatus;

acquiring means configured to acquire information associated with generation of recording data, which is different from the device state information, as recording information, in association with the recording data;

generating means configured to generate unique identification information of the recording data based on the device identification information, the device state information, and the recording information; and recording means configured to record a file including the recording data and the unique identification information generated by the generating means in a recording medium.

According to another aspect of the present invention, there is provided a method of controlling a data processing apparatus, comprising:

a holding step of holding device state information which is updated according to use of the data processing apparatus and represents a use state of the apparatus, and device identification information unique to the apparatus;

an acquiring step of acquiring information associated with generation of recording data, which is different from the device state information, as recording information, in association with the recording data;

a generating step of generating unique identification information of the recording data based on the device identification information, the device state information, and the recording information; and a recording step of recording a file including the recording data and the unique identification information generated in the generating step in a recording medium.

Further features of the present invention will become apparent from the following description of exemplary embodiments with reference to the attached drawings.

BRIEF DESCRIPTION OF THE DRAWINGS

FIG. 7 shows an example of directory entries recorded in the recording medium 200;

DESCRIPTION OF THE EMBODIMENTS

Preferred embodiments of the present invention will now be described in detail in accordance with the accompanying drawings.

In the embodiments to be described hereinafter, a case will be exemplified wherein the present invention is applied to an image pick up apparatus (to be referred to as a digital camera hereinafter) which can record (shoot) a still image and moving image, and can record an audio signal.

First Embodiment

Description of Image Pick Up Apparatus

Figure 1:
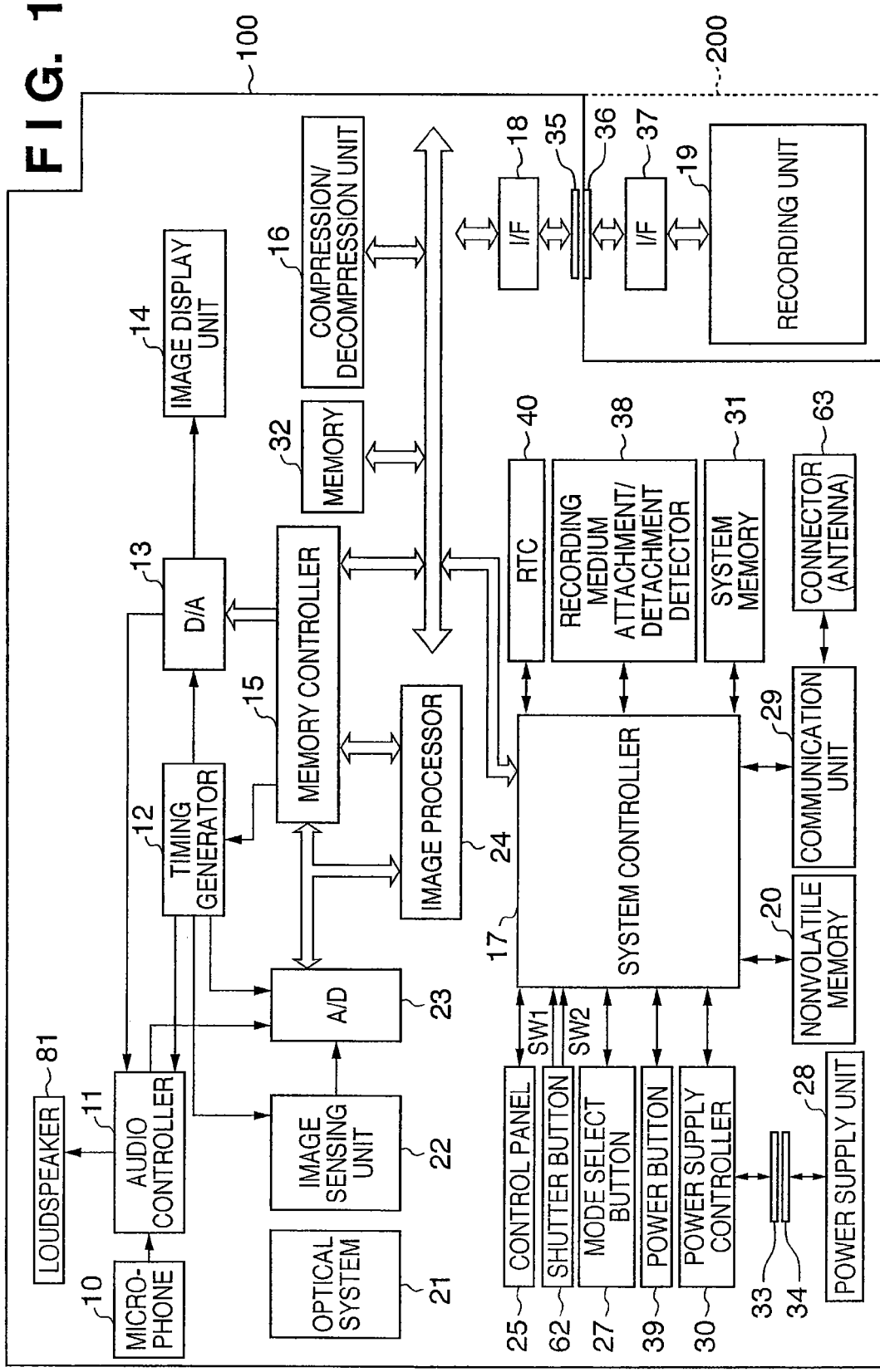
FIG. 1 is a block diagram showing an arrangement of a digital camera.

FIG. 1 is a block diagram showing an example of the arrangement of a digital camera 100 according to this embodiment. The digital camera 100 serves as an image recording apparatus which records data of still images and moving images, and as an image playback apparatus which displays images based on these data, and is an example of a data processing apparatus to which the present invention is applicable. Referring to FIG. 1, an optical system 21 includes a shooting lens, and forms an optical image on an image capturing plane of an image sensing unit 22. The image sensing unit 22 comprises a CCD, CMOS element, or the like, and converts an optical image into an electrical signal. An A/D converter 23 converts an analog image signal output from the image sensing unit 22 into a digital signal, and converts an analog audio signal output from an audio controller 11 into a digital signal.

A timing generator 12 supplies clock signals and control signals to the image sensing unit 22, the audio controller 11, the A/D converter 23, and a D/A converter 13. The timing generator 12 is controlled by a memory controller 15 and system controller 17. An image processor 24 applies predetermined pixel interpolation processing, resize processing such as reduction or the like, color conversion processing, and the like to data from the A/D converter 23 or data from the memory controller 15. The image processor 24 makes predetermined arithmetic processing using captured image data, and supplies the obtained arithmetic result to the system controller 17. The system controller 17 executes exposure control, ranging control, and the like based on the arithmetic result. In this way, the system controller 17 executes TTL (through the lens) AF (auto focus) processing, AE (auto exposure) processing, and EF (flash pre-emission) processing. The image processor 24 executes predetermined arithmetic processing using captured image data, and also executes TTL AWB (auto white balance) processing based on the obtained arithmetic result.

The output data from the A/D converter 23 is written in a memory 32 via the image processor 24 and memory controller 15 or directly through the memory controller 15. The memory 32 stores image files of still images and moving images obtained via the image sensing unit 22, and audio files of audio signals obtained via a microphone 10. The memory 32 also stores file headers upon forming these image files and audio files. The memory 32 has a storage capacity large enough to store a predetermined number of still images, and a moving image and audio signal of a predetermined period of time.

A compression/decompression unit 16 compresses/decompresses image data by adaptive discrete cosine transformation (ADCT) or the like. The compression/decompression unit 16 executes compression processing by reading a shot image which is stored in the memory 32 in the shooting processing started in response to pressing of, for example, a shutter button, and writes the processed data in the memory 32. Also, the compression/decompression unit 16 executes decompression processing of compressed image data which is loaded from a recording medium 200 or the like into the memory 32, and writes the processed data to the memory 32. The image data written in the memory 32 by the compression/decompression unit 16 is converted into a file by the system controller 17, and that file is recorded in the recording medium 200 via an interface 18. The memory 32 also serves as an image display memory, and image data for display written in the memory 32 is displayed on an image display unit 14 via the D/A converter 13. The image display unit 14 comprises, for example, an LCD.

An audio signal output from the microphone 10 is supplied to the A/D converter 23 via the audio controller 11 which comprises an amplifier and the like, and is converted into a digital signal. The digital audio signal is then stored in the memory 32 by the memory controller 15. On the other hand, audio data recorded in the recording medium 200 is loaded into the memory 32, and is then supplied to the audio controller 11 via the D/A converter 13. The audio controller 11 drives a loudspeaker 81 in accordance with the audio signal from the D/A converter 13.

The system controller 17 controls the overall digital camera 100. A system memory 31 stores constants, variables, programs, and the like required for operations of the system controller 17. A nonvolatile memory 20 is an electrically erasable/recordable memory, and uses, for example, an EEPROM or the like. The nonvolatile memory 20 stores control programs required for the system controller 17 to execute various kinds of control to be described later. The control programs stored in the nonvolatile memory 20 are loaded into the system memory 31 as needed, and are executed by the system controller 17. A shutter button 62, control panel 25, mode select button 27, and power button 39 are operation buttons used by the user to input various operation instructions to the system controller 17.

A first shutter switch signal SW1 is set ON at the middle pressing (half stroke) position of the shutter button 62 provided to the digital camera 100. Upon detection of the ON first shutter switch signal SW1, the system controller 17 starts the operations of the AF (auto focus) processing, AE (auto exposure) processing, AWB (auto white balance) processing, EF (flash pre-emission) processing, and the like. A second shutter switch signal SW2 is set ON at the pressing completion (full stroke) position of the shutter button 62. Upon detection of the ON second shutter switch signal SW2, the system controller 17 starts the operations of a series of image capturing processes from when a signal is read from the image sensing unit 22 until image data is written in the recording medium 200.

The control panel 25 comprises various buttons, a touch panel, and the like. The control panel 25 includes, for example, an erase button, menu button, SET button, arrow keys arranged in a cross pattern, and the like. Upon pressing the menu button, a menu window that allows various settings is displayed on the image display unit 14. The user can intuitively make various settings using the menu window displayed on the image display unit 14, and the arrow keys and SET button. The mode select button 27 allows the user to switch the operation mode of the system controller 17 to one of a still picture mode, continuous shooting mode, moving image mode, playback mode, and the like. The power button 39 is used to turn on/off the power supply of the digital camera 100.

A power supply controller 30 comprises a battery detection circuit, DC-DC converter, switch circuit that switches blocks to be energized, and the like, and detects the presence/absence of attachment of a battery, the type of battery, and the remaining battery capacity. The power supply controller 30 controls the DC-DC converter based on the detection results and an instruction from the system controller 17, and supplies required voltages to respective units including the recording medium 200 for required periods of time. A power supply unit 28 comprises a primary battery such as an alkali battery, lithium battery, or the like, a secondary battery such as an NiCd battery, NiMH battery, Li battery, or the like, an AC adapter, and the like. Connectors 33 and 34 connect the power supply unit 28 and power supply controller 30.

An RTC (Real Time Clock) 40 holds an internal power supply unit independently of the power supply unit 28, and maintains a timepiece operation state even when no electric power is supplied from the power supply unit 28. The system controller 17 executes timer control using a date and time acquired from the RTC 40 upon startup.

An interface 18 is that with the recording medium 200. A connector 35 connects the recording medium 200 and interface 18. A recording medium attachment/detachment detector 38 detects whether or not the recording medium 200 is attached to the connector 35. The recording medium 200 comprises a recording unit 19 comprising a semiconductor memory, magnetic disk, or the like, an interface 37 with the digital camera 100, and a connector 36 that connects the recording medium 200 and digital camera 100.

A communication unit 29 executes various kinds of communication processing of RS232C, USB, IEEE1394, P1284, SCSI, modem, LAN, wireless communication, and the like. A connector 63 (antenna in case of a wireless communication) connects the digital camera 100 to another device via the communication unit 29.

<Description of Operation (Record Image File by Shooting)>

The operation of the digital camera 100 according to this embodiment will be described below. Note that the processes to be described hereinafter with reference to the accompanying flowcharts indicate those implemented when the system controller 17 loads the control programs stored in the nonvolatile memory 20 onto the system memory 31, and executes them to attain arithmetic processing and control.

Figure 2:
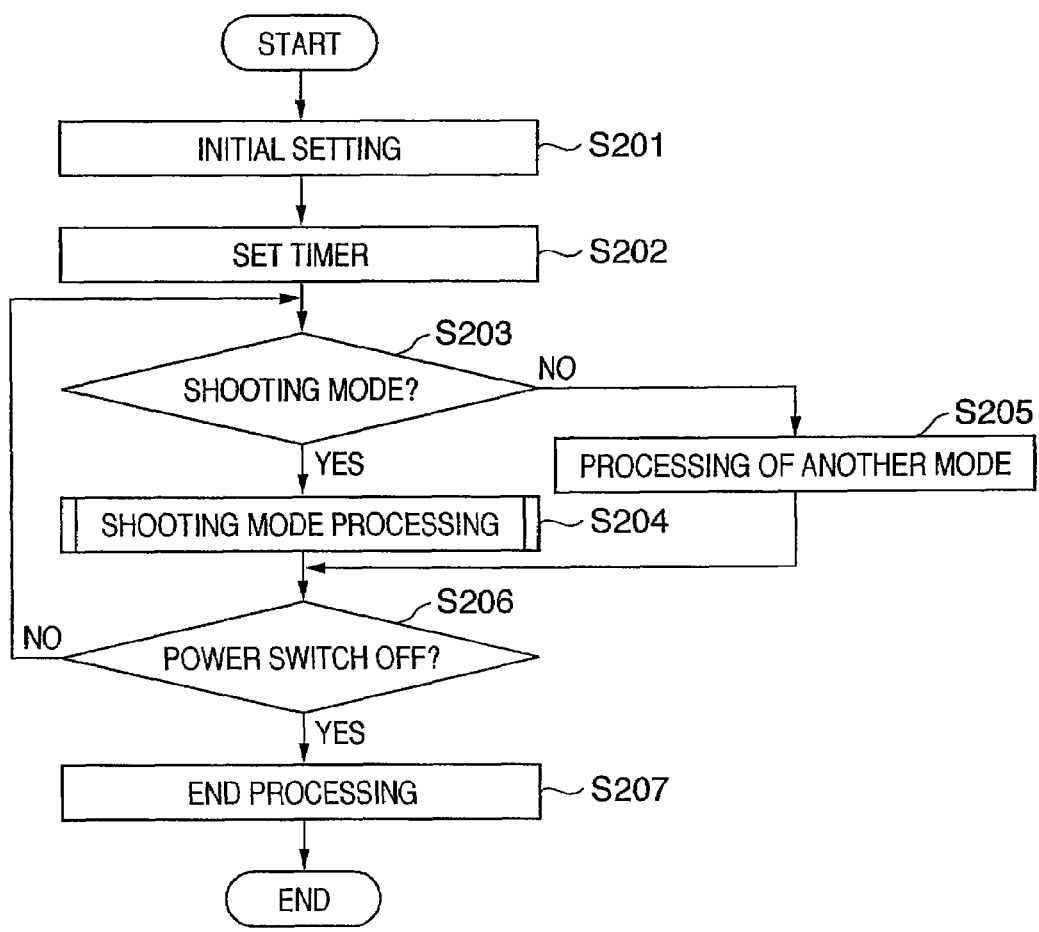
FIG. 2 is a flowchart showing an overall operation of a digital camera 100.

FIG. 2 is a flowchart for explaining the overall operation of the digital camera 100 according to the first embodiment.

After the user presses the power button 39 to turn on the power supply, the system controller 17 initializes flags, control variables, and the like in step S201. In step S202, the system controller 17 acquires the date and time from the RTC 40, and makes settings for a system timer. In step S203, the system controller 17 checks the setting state of the mode select button 27. If a shooting mode is set by the mode select button 27, the system controller 17 executes shooting mode processing in step S204. Details of this shooting mode processing will be described later with reference to FIG. 3. On the other hand, if it is determined in step S203 that the mode select button 27 is set in another mode other than the shooting mode, the process advances to step S205. In step S205, the system controller 17 executes processing according to the selected mode. Another mode includes, for example, a playback mode, communication mode, or audio recording mode. In the playback mode, image files recorded in the shooting mode are played back and displayed. In the communication mode, a communication is made with an external device via the communication unit 29 and connector 63 to exchange data. In the audio recording mode, an audio signal input via the microphone 10 is recorded in association with an image.

Upon completion of the shooting mode processing or the processing of the corresponding mode, the process advances to step S206. The system controller 17 checks the setting position of the power button 39 in step S206. If the power button 39 is set to the power ON position, the process returns to step S203. If it is determined in step S206 that the power button 39 is set to the power OFF position, the process advances to step S207 to execute end processing. In the end processing, for example, the system controller 17 changes display on the image display unit 14 to the end state, records parameters and setting values including the flags, control variables, and the like, and the set mode in the nonvolatile memory 20, and shuts off the power supply to the units which do not require any power supply after power OFF. Upon completion of the end processing, the system controller 17 ends the processing shown in FIG. 2.

The shooting mode processing (that in step S204 in FIG. 2) of the digital camera 100 according to the first embodiment will be described below. Note that the image capturing processing started upon pressing of the shutter button 62 in the shooting mode will be described below.

The first shutter switch signal SW1 is set ON at the half stroke position of the shutter button 62. As described above, the system controller 17 starts the operations of the AF processing, AE processing, AWB processing, EF processing, and the like in response to the ON first shutter switch signal SW1. The second shutter switch signal SW2 is set ON at the pressing completion (full stroke) position of the shutter button 62.

Figure 3:
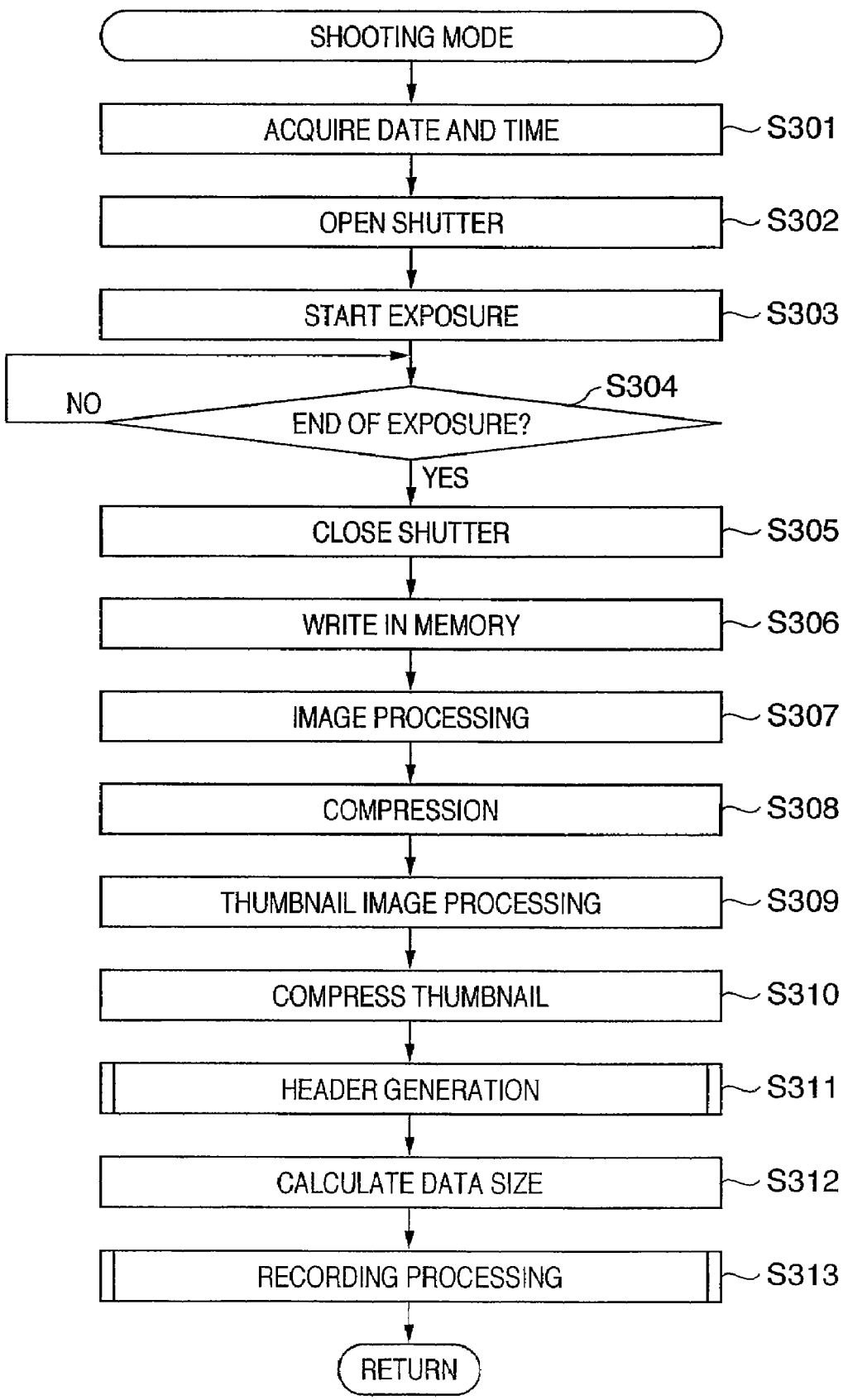
FIG. 3 is a flowchart showing an shooting sequence of the digital camera 100.

The system controller 17 recognizes this operation as an operation start instruction of a series of image capturing processes, and starts shooting (processing shown in FIG. 3).

Upon starting the shooting, in step S301 the system controller 17 acquires the current value (date and time) from the timer set in step S202 in FIG. 2, and holds it in the system memory 31. In steps S302 to S305, the system controller 17 executes shooting at a shutter speed determined by the AE processing. More specifically, the system controller 17 opens a shutter in step S302 and starts exposure in step S303. The system controller 17 checks in step S304 the end of exposure based on the shutter speed (exposure time) determined by the AE processing executed while the first shutter switch signal SW1 is ON. The shutter speed determined by the AE processing is saved in, for example, the system memory 31, and is acquired from there. If the end of exposure is determined, that is, if the exposure time corresponding to the acquired shutter speed has elapsed, the system controller 17 closes the shutter in step S305. In step S306, the system controller 17 reads out a signal (image signal) accumulated in the image sensing unit 22 by the shooting operation, converts it into digital data by the A/D converter 23, and writes the digital data in the memory 32.

Subsequently, in step S307 the system controller 17 applies image processing to the image data written in the memory 32 using the memory controller 15 and image processor 24. In step S308, the compression/decompression unit 16 compresses the image data that has undergone the image processing to generate compressed image data. Note that the compressed image data is configured by various marker codes and compressed data, as will be described later with reference to FIG. 4.

In step S309, the system controller 17 applies image processing for a thumbnail to the image data that has undergone the image processing and is stored in the memory 32, using the memory controller 15 and image processor 24, so as to obtain a thumbnail image. In step S310, the system controller 17 applies compression for a thumbnail to the thumbnail image, and stores the result in the memory 32. The image that has undergone the compression for a thumbnail and is stored in the memory 32 will be referred to as "thumbnail" hereinafter.

In step S311, the system controller 17 generates an image file header mainly including shooting time information in the memory 32. The header generation processing in step S311 will be described later with reference to FIG. 15. In step S312, the system controller 17 calculates the sum of the data size of the compressed image data generated in step S308, that of the thumbnail generated in step S310, and the header size generated in step S311, and stores the sum in the system memory 31. In step S313, the system controller 17 executes shot image recording processing to be described later with reference to FIG. 6, thus ending the processing shown in FIG. 3. Note that the recording processing in step S313 may be executed in synchronism with the aforementioned shooting sequence or asynchronously. In this way, the image file is generated and is written in the recording medium.

Figure 4:
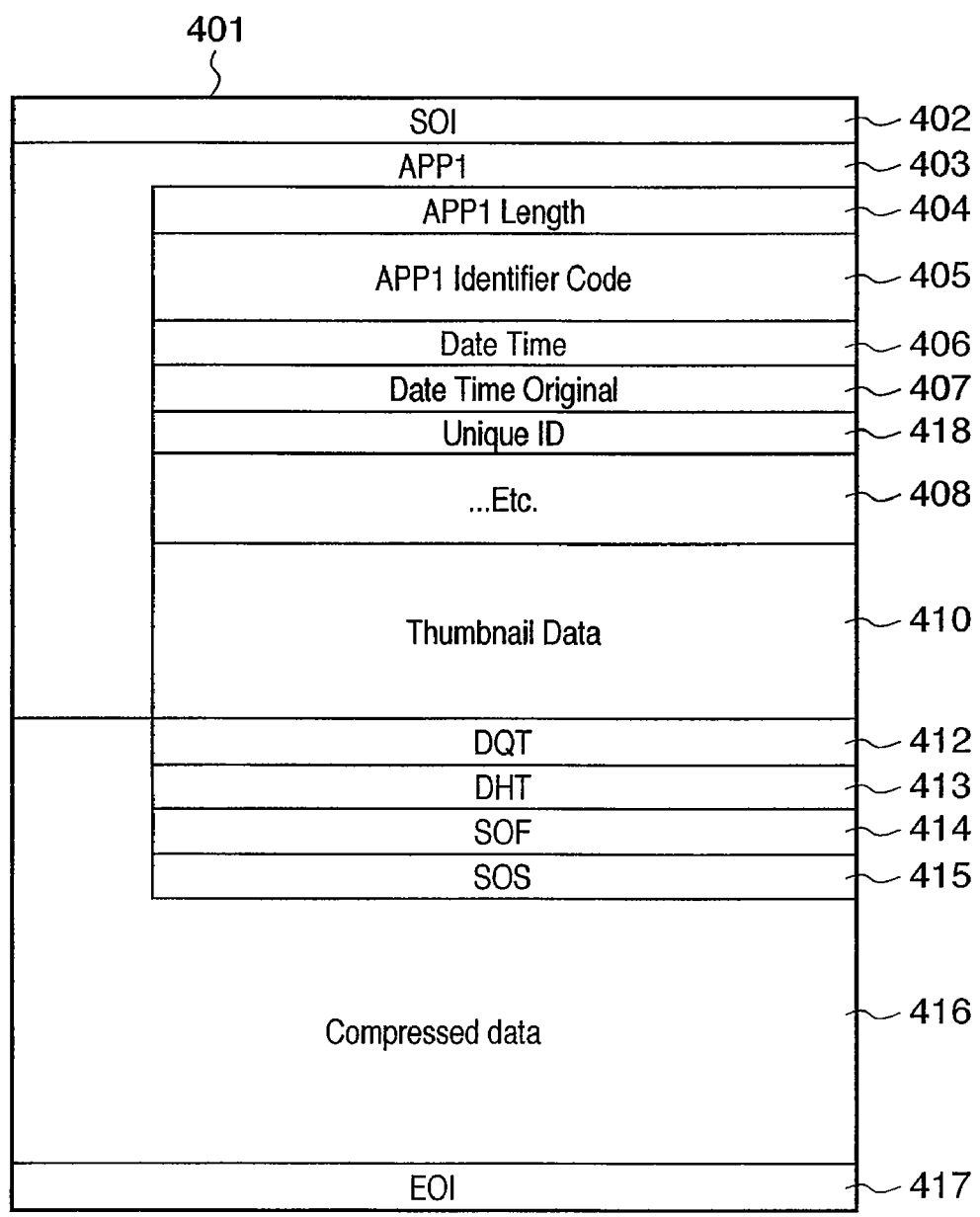
FIG. 4 shows an example of the configuration of a still image file recorded in a recording medium 200.

FIG. 4 shows an example of the data configuration of the image file generated by the processing in FIG. 3. An image file 401 generated by the shooting processing has a marker SOI 402 indicating the start of the image at the head of the file. The image file 401 has an application marker (APP1) 403 after the SOI 402. The application marker 403 includes:

APP1 Length 404 indicating the size of APP1;
APP1 Identifier Code 405 as an identification code of APP1;
Date Time 406 indicating the generation date and time of image data;
Date Time Original 407 indicating the generation date and time of original image data;
Etc 408 as miscellaneous shooting information;
Unique ID 418 as a file unique ID of the image file of interest; and
thumbnail data Thumbnail Data 410 described above.

Upon generating the application marker 403 in step S311 (header generation processing), the Date Time 406 and Date Time Original 407 store the shooting date and time information stored in the system memory 31 in step S301.

The compressed image data generated in step S308 includes a quantization table (DQT) 412, Huffman table (DHT) 413, frame start marker (SOF) 414, scan start marker (SOS) 415, and compressed data 416. The compressed image data is terminated by a marker (EOI) 417 indicating the end of image data.

Figure 5:
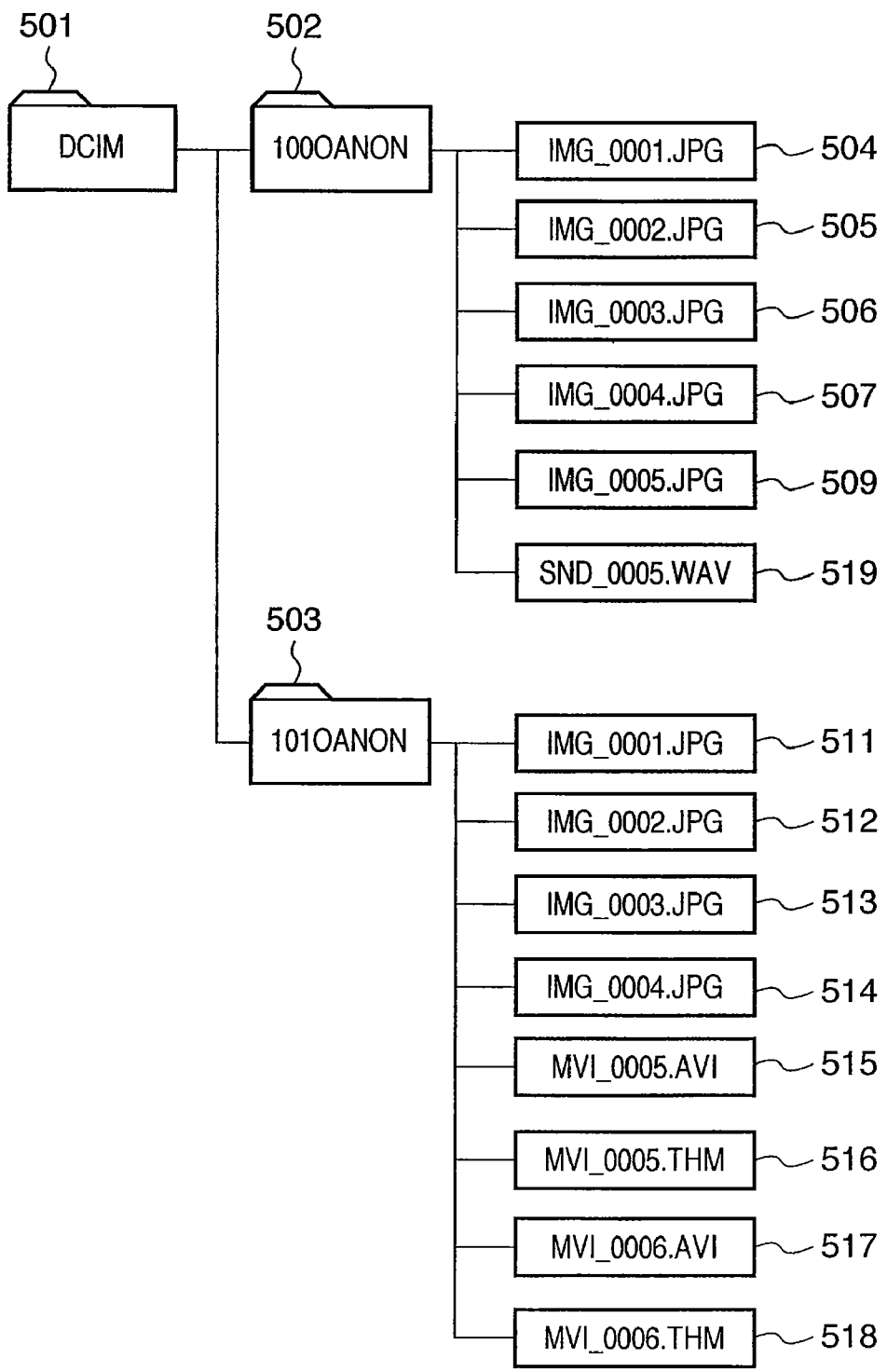
FIG. 5 shows an example of the file structure recorded in the recording medium 200.

FIG. 5 shows an example of the configuration of directories recorded in the recording medium 200 as a result of the recording processing in step S313. Under the root directory, a DCIM directory 501 is recorded, and subdirectories each having a name generated using eight characters are generated under the DCIM directory 501. The name held by each subdirectory includes first three characters as a numeric part starting from 100, and a subdirectory name whose numeric part is incremented by one every time a new subdirectory is generated is assigned (subdirectories 502 and 503). Under the subdirectory 502, various files 504 to 507, 509, and 519 generated by the digital camera 100 of this embodiment are generated. Note that the file name to be generated conforms to the following file name generation rule. That is, the file name includes a file name of eight characters, and an extension of three letters indicating the type of file. Of the file name, the last four characters are a numeral starting from 0001, and the numeral is incremented by one for each shooting, thus assigning a file name. Note that "JPG" is assigned to an extension of a still image, "AVI" is assigned to that of a moving image, and "WAV" is assigned to that of an audio signal.

Figure 6:
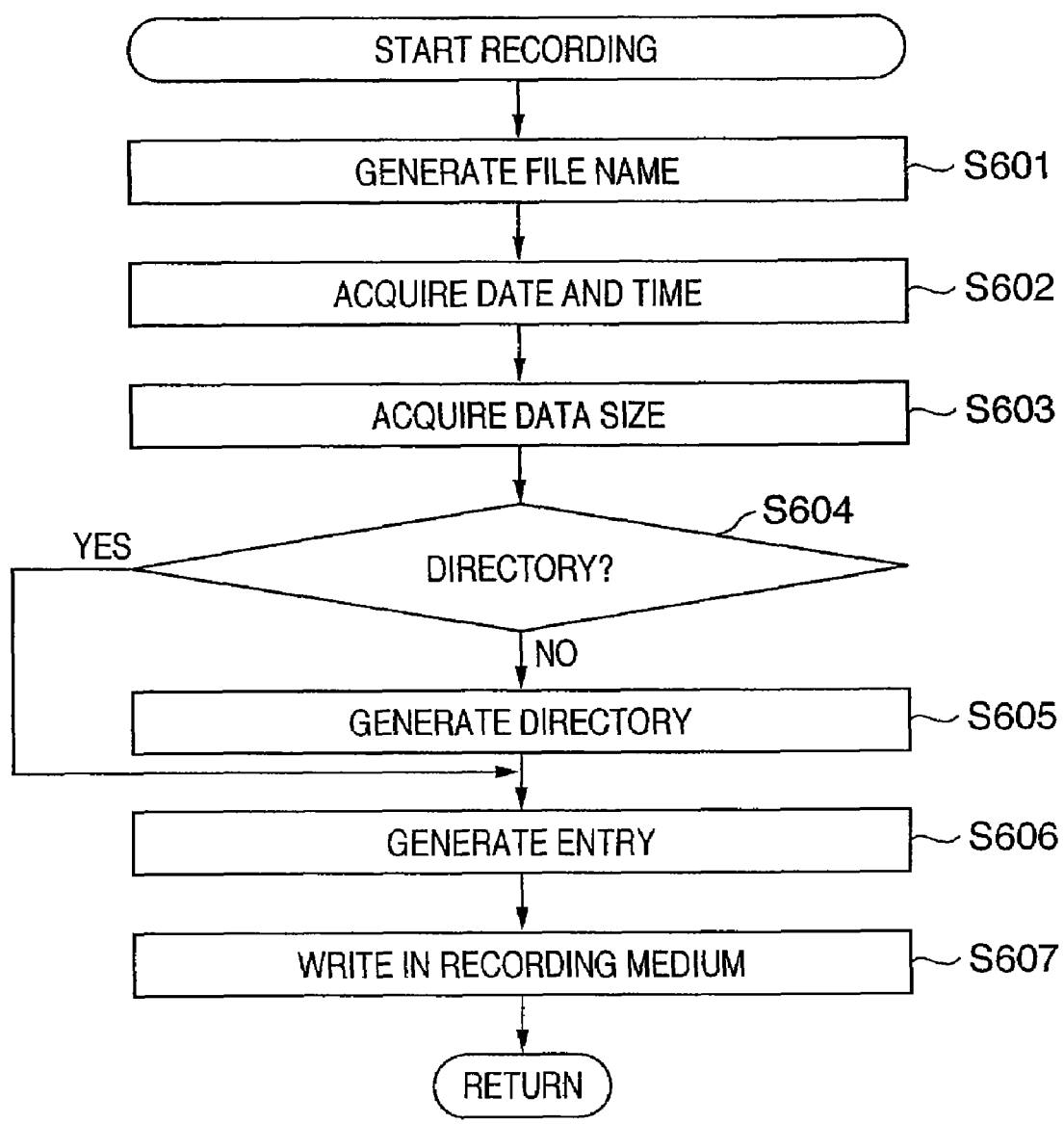
FIG. 6 is a flowchart showing a recording sequence of the digital camera 100 for the recording medium 200.

FIG. 6 is a flowchart showing details of the recording processing (step S313 in FIG. 3) for recording image data generated by the aforementioned shooting sequence in the recording medium.

When the recording processing starts, in step S601 the system controller 17 generates a file name according to the aforementioned file name generation rule. The system controller 17 acquires the date and time information stored in the system memory 31 in step S301 of the shooting sequence in step S602, and acquires the data size of the file to be recorded in step S603. Note that the data size of the file is calculated in step S312.

After that, the system controller 17 checks in step S604 if a directory that stores the generated file exists in the recording medium 200. This embodiment adopts a DCF directory which is standardized in a format of "/DCIM/xxxYYYY": xxx is a directory number (a numerical character string from 100 to 999), and YYYY is an ASCII character string. If the number of files stored in a directory having a maximum directory number is less than an upper limit value, the system controller 17 determines the directory having the maximum directory number to be a storage location of the generated file. In this case, the directory that stores the generated file exists on the recording medium 200. On the other hand, if the number of files stored in the directory having the maximum directory number is equal to or larger than the upper limit value or if no directory exists, the process advances to step S605 because no directory that stores the generated file exists.

If no directory exists, the system controller 17 generates a directory that stores the generated file (e.g., 100OANON (subdirectory 502)) in step S605, and the process advances to step S606. As the generation method of a directory name, a directory name having the maximum directory number +1 may be generated. On the other hand, if the directory already exists, the process jumps from step S604 to step S606. In step S606, the system controller 17 generates a directory entry using the file name generated in step S601 and the date and time information acquired in step S602.

FIG. 7 is a view for explaining a directory entry. Directory entries 707 to 710, 712, 717, and 713 to 716 entering a directory entry set 701 respectively correspond to files 504 to 507, 509, 519, and 515 to 518 in the example of the directory configuration shown in FIG. 5. The contents of an extension field 702 are as has been described above using FIG. 5. In step S607, the system controller 17 records the value acquired in step S602 in a generation date and time field 703 and update date and time field 704 in the directory entry set 701. Therefore, the same value is described in the generation date and time field 703 and update date and time field 704. Also, the system controller 17 records the data size of the image file stored in the system memory 31 in step S312 in a file size field 706, and also a start cluster number indicating a free data area in the recording medium 200 (that of a data area where the image file of interest is stored) in a start cluster number field 705.

Upon completion of generation of the directory entry corresponding to the file of interest, in step S607 the system controller 17 writes the directory entry generated in step S606 and the image data generated by the shooting processing in the recording medium 200. The system controller 17 then ends the recording processing.

<Description of Operation (Playback to Edit of Image File)>

The processing for generating a new file using the image file recorded in the recording medium 200 in the shooting mode will be described below.

Figure 8:
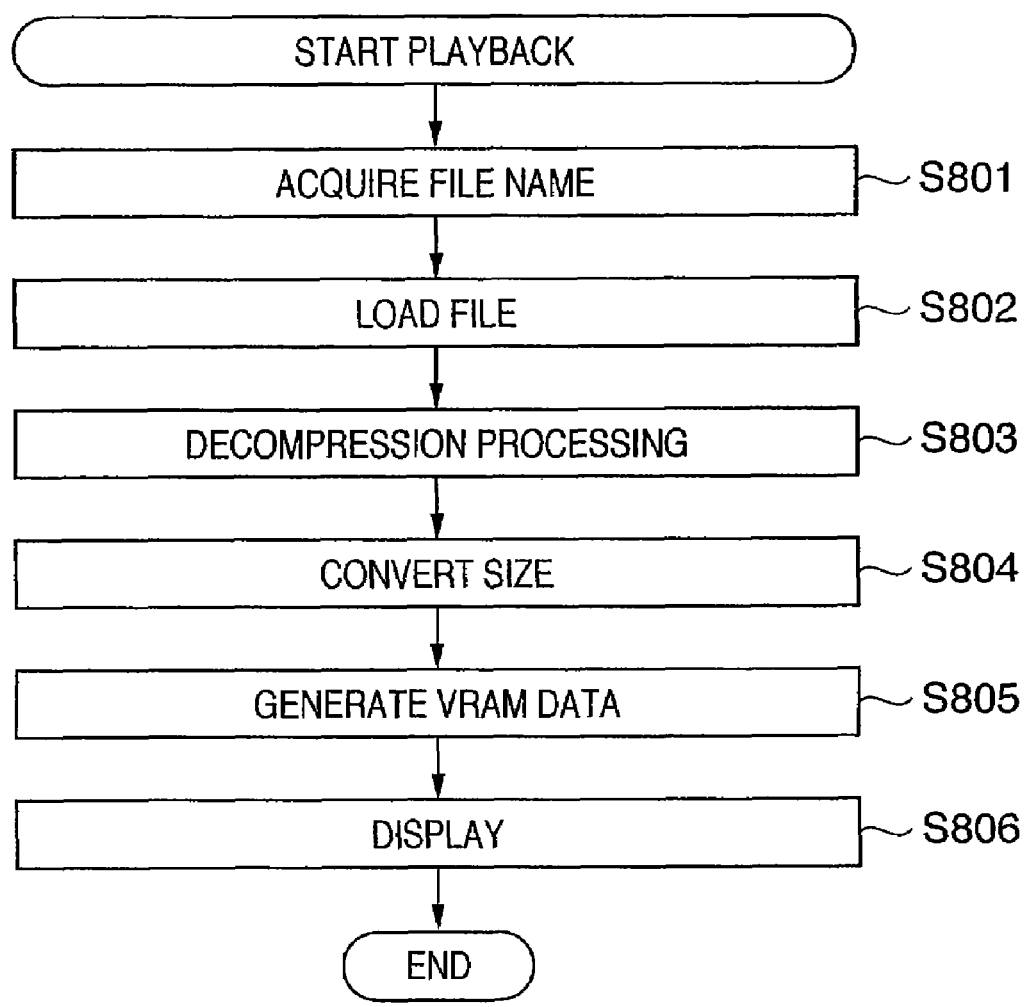
FIG. 8 is a flowchart showing a playback sequence of the digital camera 100.

When the mode select button 27 is switched to the playback mode, the system controller 17 executes the playback processing for playing back image files recorded in the recording medium 200 to have the data structure described above using FIG. 5 on the image display unit 14. The playback processing will be described below with reference to FIG. 8.

Upon starting playback, in step S801 the system controller 17 acquires the file names of files to be played back with reference to the directory entry recorded in the recording medium 200. In step S802, the system controller 17 reads out the files to be played back from the recording medium 200 into the memory 32. In step S803, the system controller 17 applies decompression processing to the read out files using the compression/decompression unit 16, and stores the decompressed image data in the memory 32 again. The system controller 17 resizes the decompressed image data stored in the memory 32 to a display size in step S804, and stores the resized image data in the memory 32 as VRAM data in step S805. Finally, in step S806 the system controller 17 outputs the VRAM data stored in the memory 32 to the image display unit 14 via the memory controller 15 and D/A converter 13, thus displaying images.

Figure 9:
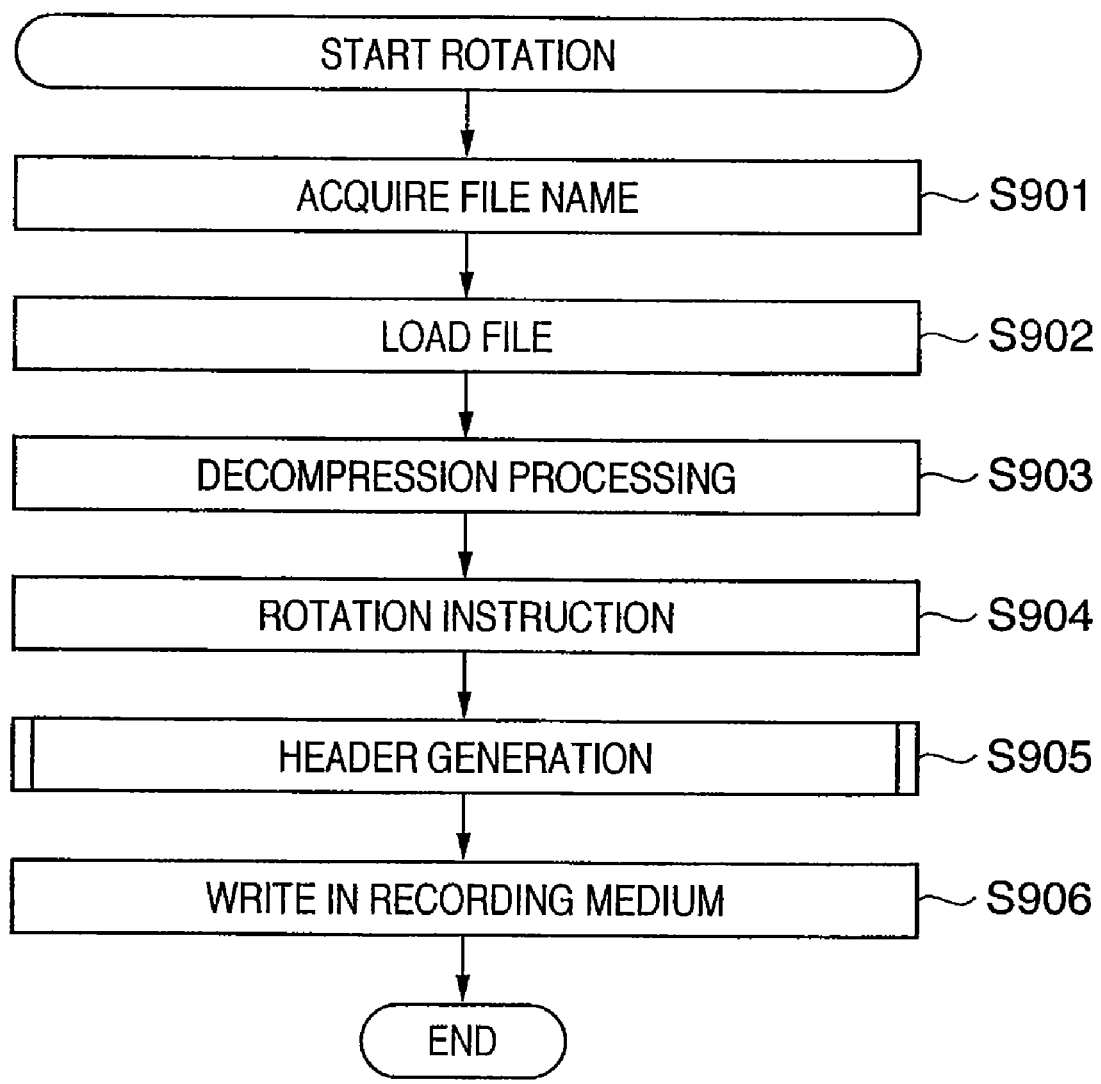
FIG. 9 is a flowchart showing a rotation processing sequence of the digital camera 100.

The user can sequentially determine the file names of files to be played back from the directory entry using the arrow keys included in the control panel 25. That is, the user sequentially selects image files recorded in the recording medium 200 using the arrow keys to apply the playback process to the selected image files, and can browse the image files in the recording medium 200 using the image display unit 14. While browsing, the rotation operations of images can be accepted. The rotation processing of an image between the landscape and portrait orientations will be described below with reference to FIG. 9. Upon acceptance of a rotation instruction at the control panel 25, the system controller 17 starts the rotation processing shown in the flowchart of FIG. 9 for an image which is being displayed on the image display unit 14. Note that this embodiment implements the rotation operation by changing "Orientation" (included in the shooting information Etc 408) as a rotation attribute of the file header. At this time, the system controller 17 does not generate any file unique ID (Unique ID 418) and changes only the rotation attribute (Orientation).

The system controller 17 acquires the file name of the file to be rotated in step S901, and loads that file from the recording medium 200 in step S902. In step S903, the system controller 17 decompresses the image data using the compression/decompression unit 16, and stores the decompressed image data in the memory 32. Upon acceptance of a rotation instruction in step S904, the system controller 17 executes header generation processing to be described later with reference to FIG. 15 to update the rotation attribute (Orientation) in step S905. In step S906, the system controller 17 writes the result in the recording medium 200. As will be described later with reference to FIG. 15, the header generation processing executed in step S905 does not generate any file unique ID but changes only the rotation attribute.

Figure 10:
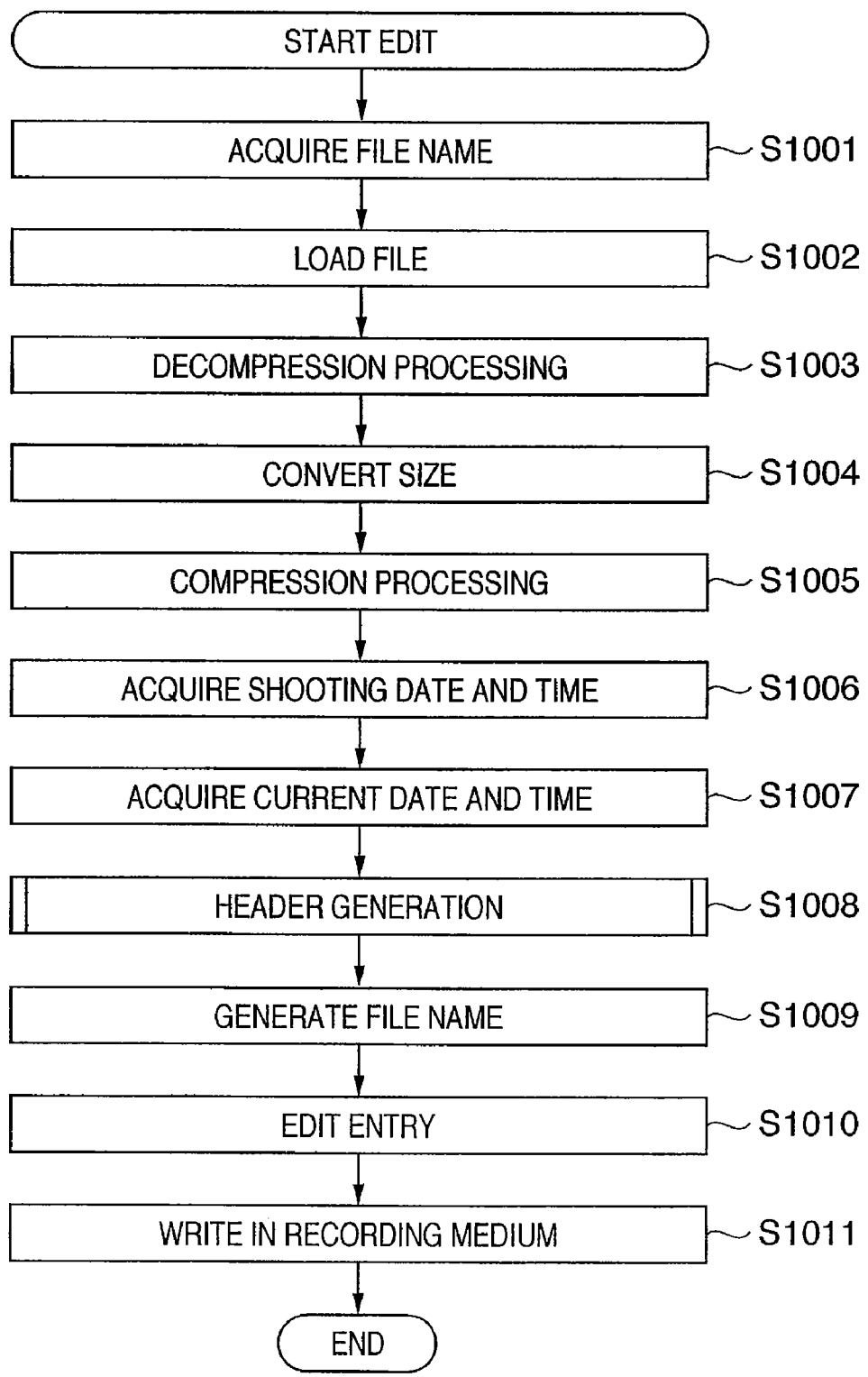
FIG. 10 is a flowchart showing a still image edit sequence of the digital camera 100.

The digital camera 100 of this embodiment allows the user to execute edit processing for applying image size conversion to an image file displayed on the image display unit 14 and recording a new image file. This processing will be described below with reference to FIG. 10.

Upon starting the edit processing, in step S1001 the system controller 17 selects image data displayed on the image display unit 14 as data to be edited, and acquires its file name. Assume that the file name of the file to be edited is IMG_0002.JPG. In step S1002, the system controller 17 loads image data recorded in the recording medium 200 and its directory entry into the memory 32 based on the file name acquired in step S1001. In step S1003, the system controller 17 decompresses the image data using the compression/decompression unit 16, and stores the decompressed image data in the memory 32. In step S1004, the system controller 17 executes enlargement/reduction processing to a predetermined image size to the decompressed image data, and stores the size-changed image in the memory 32. In step S1005, the system controller 17 applies compression processing to the size-changed image, and stores the result in the memory 32.

In step S1006, the system controller 17 acquires the contents of the generation date and time field 703 in the directory entry of the image file loaded in step S1002, and recognizes the acquired date and time as a shooting date and time. In step S1007, the system controller 17 acquires the current date and time from the system timer set in step S202. In step S1008, the system controller 17 generates a header in association with the size-changed image data. The header generation processing will be described in detail later with reference to FIG. 15. In the header generation processing in step S1008, the system controller 17 copies the header part of the original image data loaded into the memory 32, and updates items associated with the image size and generation date and time in the copied header part. That is, the system controller 17 updates a field associated with the image size in the copied header part, and changes the field of the item Date Time 406 associated with the generation date and time to the acquired current date and time. Also, the system controller 17 assigns a new file unique ID.

With the aforementioned processing, generation of new image data is complete. The system controller 17 generates a file name of the new image data to be generated in step S1009, and generates (edits) the directory entry using that file name in step S1010. In this example, assume that a file name IMG_0003.JPG is generated, and a directory entry 709 is generated. At this time, the system controller 17 sets the generation date and time of the original image acquired in step S1006 in the generation date and time field 703, and sets the current date and time acquired in step S1007 in the update date and time field 704 of the directory entry corresponding to the file. In step S1010, the system controller 17 sequentially generates the file size to be generated, and the start cluster number of the recording medium 200 that records image data. After the system controller 17 generates a directory entry in this way, it writes the size-changed image data and its directory entry in the recording medium in step S1011. In this way, the system controller 17 ends the edit processing.

Upon acquiring the shooting date and time of an original image in step S1006, it is often apparently determined that the shooting dates and times are not correctly set (e.g., "0" is set in the generation date and time fields 703 of the directory entries). In such case, the system controller 17 may acquire the contents of the update date and time field 704 in the directory entry of the original image. Likewise, the system controller 17 may use the Date Time Original 407 described in the file header of the original image for the shooting date and time.

<Reception Processing>

Figure 11:
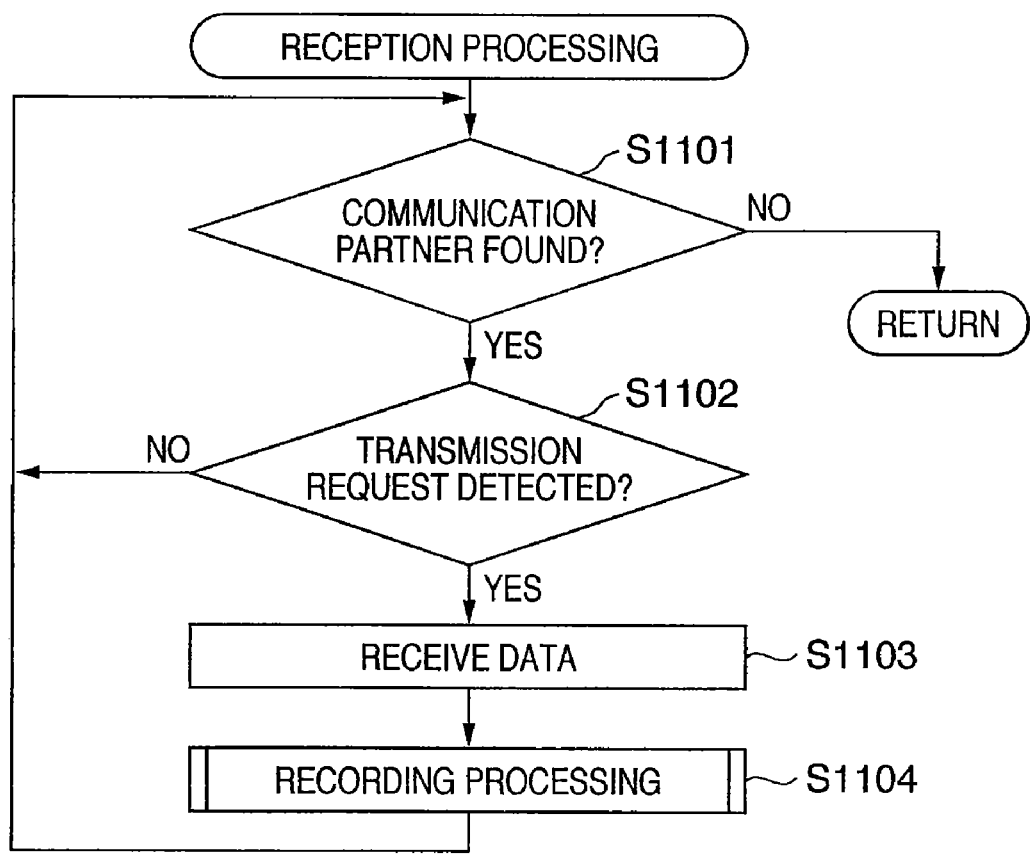
FIG. 11 is a flowchart showing a reception processing sequence of the digital camera 100.

Upon switching the mode select button 27 to the communication mode, the system controller 17 executes reception processing shown in FIG. 11. In the reception processing, the system controller 17 checks in step S1101 if a communication partner is found (if an external device which is connected to allow communications is found). If it is determined that a communication partner is not found, the system controller 17 ends this processing. If a communication partner is found, the system controller 17 checks in step S1102 if a transmission request from the communication partner is detected. If no transmission request is detected, the process returns to step S1101 to repeat confirmation of the presence/absence of a communication partner and that of a transmission request. On the other hand, if a transmission request is detected, the process advances to step S1103. In step S1103, the system controller 17 receives data from the communication partner via the communication unit 29, and temporarily holds the received data in the memory 32. The data that can be received includes a still image file, moving image file, and audio file. In step S1104, the system controller 17 writes the received data in the recording medium by the aforementioned recording processing. Therefore, the processing shown in FIG. 6 includes not only recording of image files (still image files and moving image files) but also that of audio files. Upon completion of the recording processing, the process returns to step S1101 to confirm the presence/absence of a communication partner again, and to wait for a transmission request again. At this time, the header generation processing is not executed, that is, a new file unique ID is not issued. That is, upon storing a file received from an external device in the recording medium, unique identification information is inhibited from being updated.

<Audio Processing>

Figure 12:
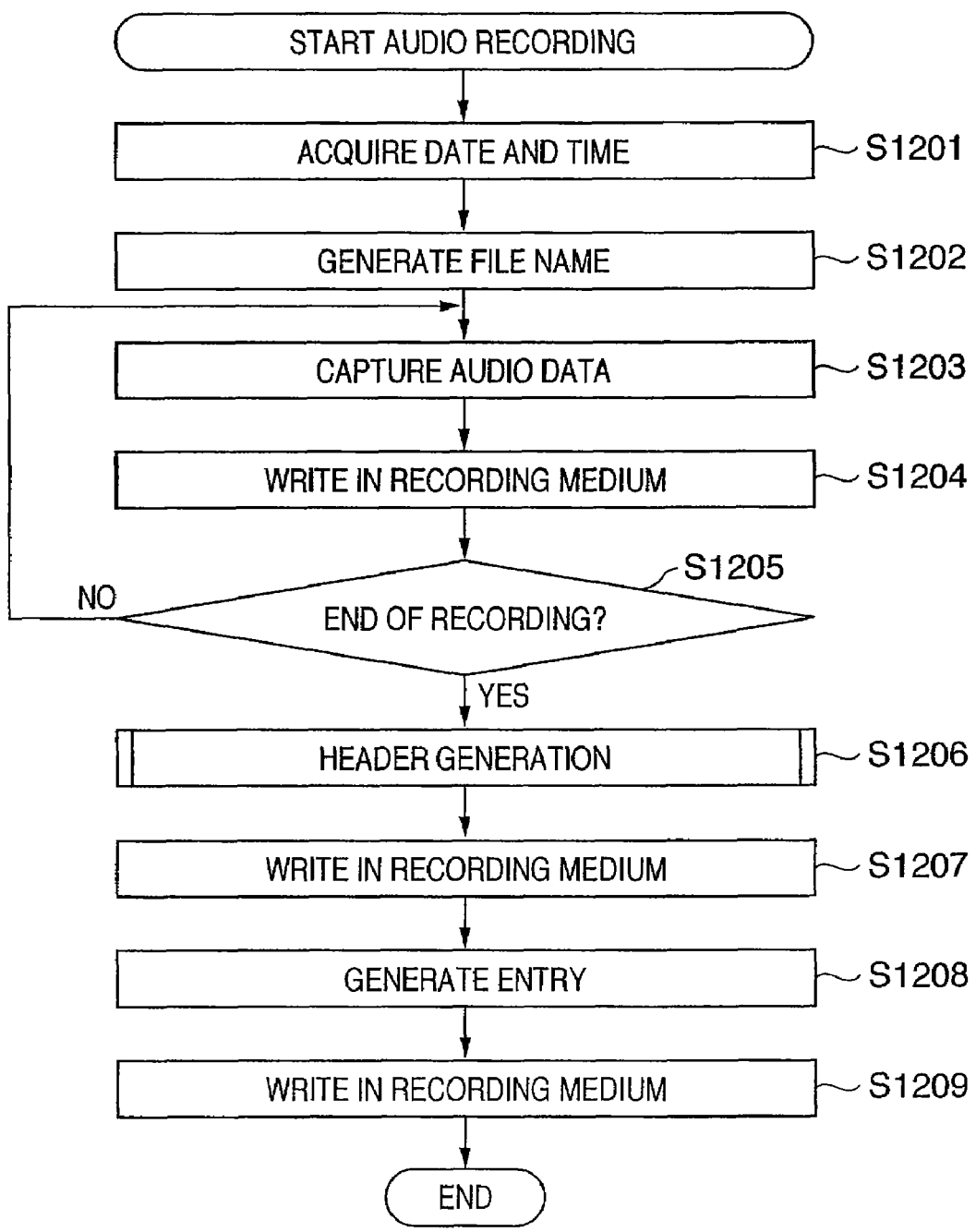
FIG. 12 is a flowchart showing a rotation processing sequence of the digital camera 100.

Upon switching the mode select button 27 to the audio recording mode, the system controller 17 executes audio recording processing shown in FIG. 12.

Figure 13:
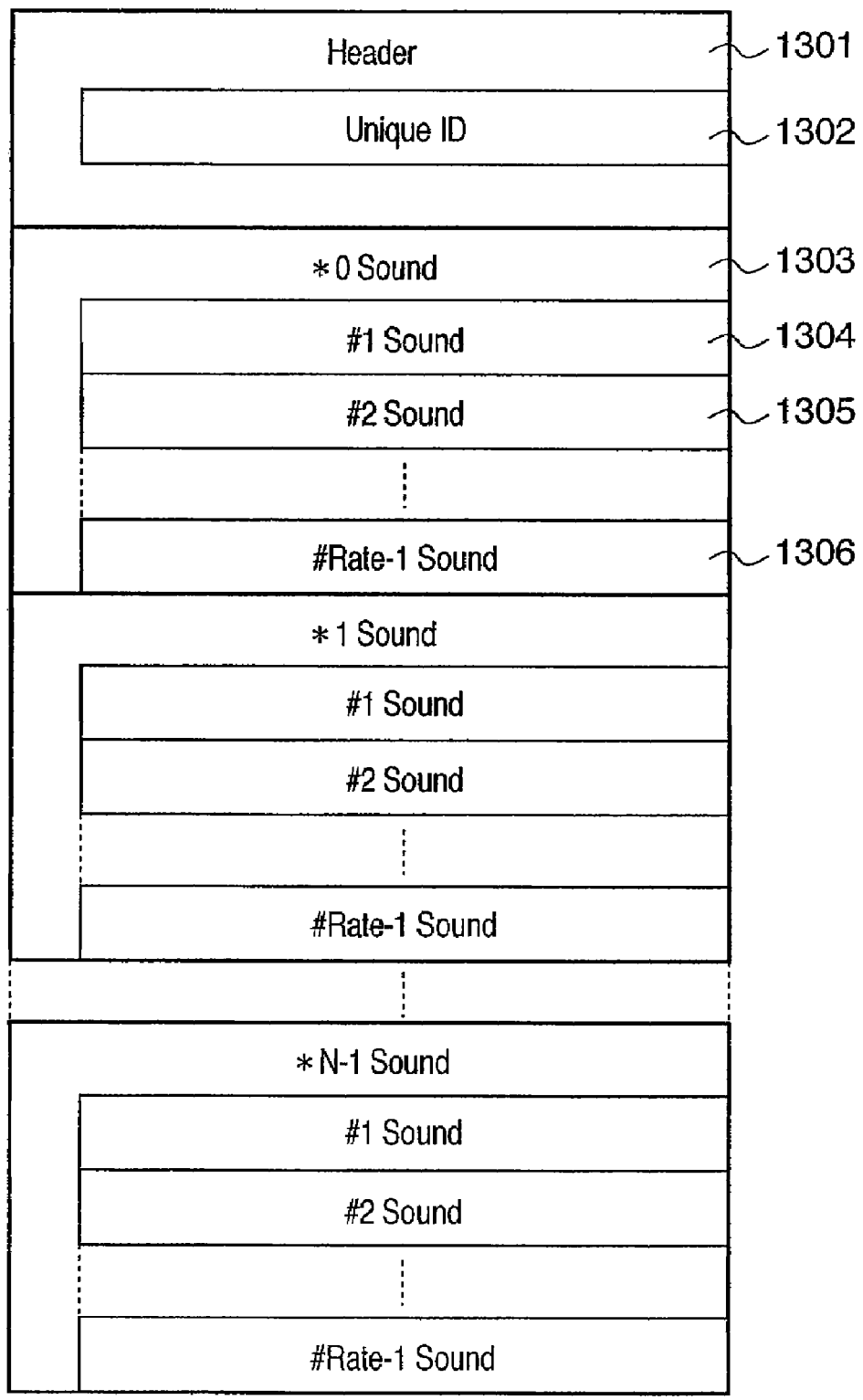
FIG. 13 shows an example of the configuration of an audio file recorded in the recording medium 200.

Upon detection of an instruction for the start of audio recording from the control panel 25 in the audio recording mode, the system controller 17 acquires the current date and time from the system timer in step S1201, and generates a file name of a file used to record an audio signal in step S1202. The file name generation method is as has been described above using FIG. 5. In step S1203, the system controller 17 begins to capture audio data. An audio signal is input from the microphone 10, and is stored as audio data in the memory 32 via the audio controller 11 and A/D converter 23. This embodiment assumes digital data in a PCM format as the audio data. FIG. 13 shows the storage format of audio data at this time. At the head part of data, a fixed-length header field 1301, which includes audio sampling rates, file unique ID (Unique ID 1302), and the like, is allocated. Immediately after the header field 1301, a fixed-length audio data field 1303, which stores audio data for 1 sec, is allocated. Fixed-length audio data for 1 sec is enumeration of audio data 1304, 1305, and 1306 according to the sampling rates.

Upon completion of storage of the data for 1 sec, in step S1204 the system controller 17 starts recording processing of the audio data stored in the memory 32 in the recording medium 200 in parallel with to the audio recording processing. By repeating steps S1203 and S1204 until an instruction for the end of recording is detected, audio data is continuously recorded. Upon detection of the instruction for the end of recording from the control panel 25, the process advances from step S1205 to step S1206, and the system controller 17 executes the header generation processing to be described later with reference to FIG. 15. In step S1207, the system controller 17 writes the header generated by the header generation processing in the recording medium 200 as the header field 1301. In step S1208, the system controller 17 generates directory entry information based on the date and time information acquired in step S1201, the file name generated in step S1202, and the final file size. In step S1209, the system controller 17 writes the generated information in the recording medium 200, thus ending the audio recording processing.

Figure 14:
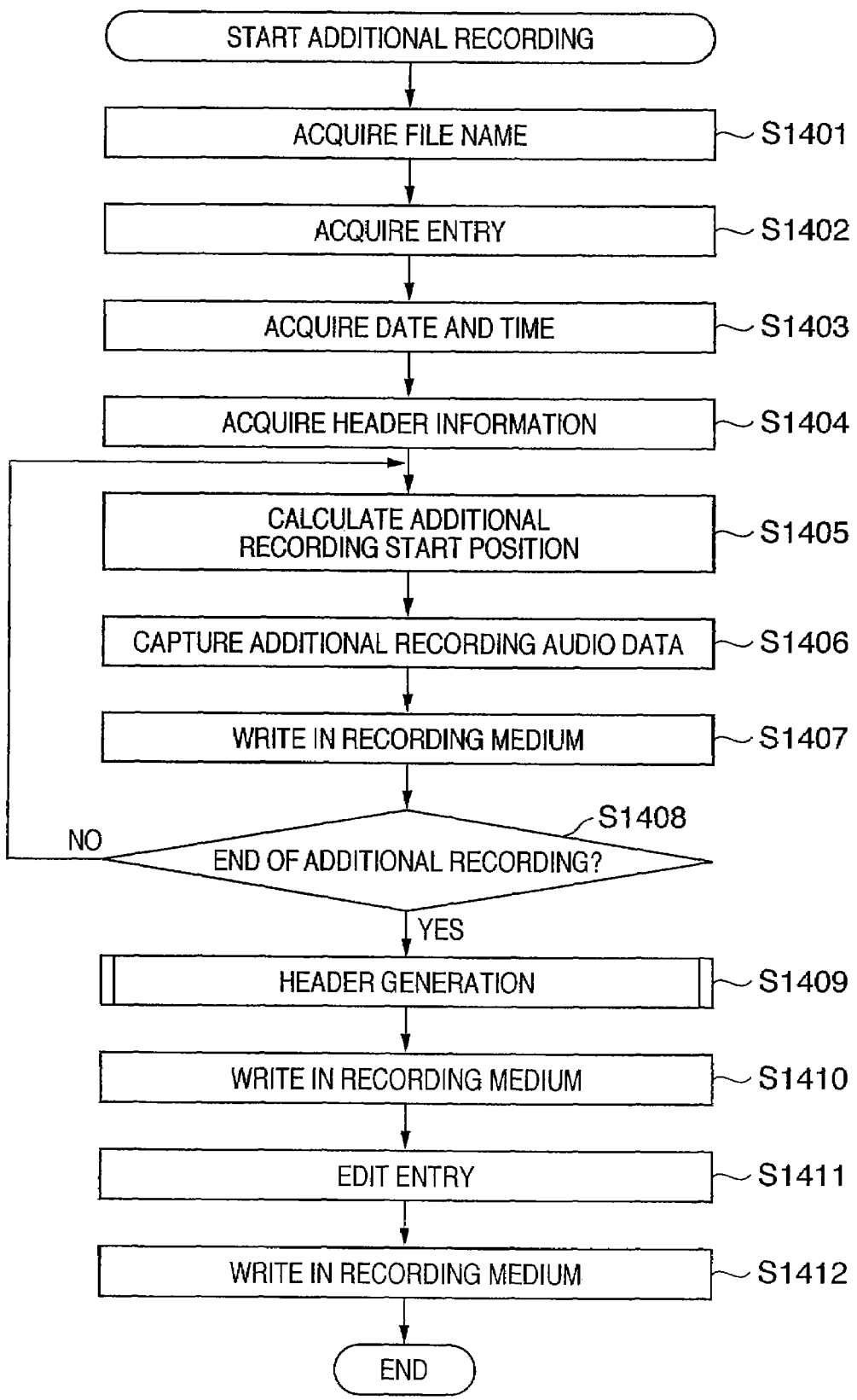
FIG. 14 is a flowchart showing an audio additional recording sequence of the digital camera 100.

Upon detection of an instruction for the start of additional audio recording from the control panel 25 in the audio recording mode, the system controller 17 starts additional audio recording processing shown in FIG. 14.

Upon starting the additional recording processing, the system controller 17 acquires the audio data file name which is to undergo additional recording in step S1401, and acquires its directory entry in step S1402. For example, the system controller 17 acquires the directory entry 717 in the directory entry set 701 in FIG. 7. Furthermore, the system controller 17 acquires the contents of the generation date and time field 703 in the entry that records the shooting date and time, and holds it in the system memory 31 in step S1403. In step S1404, the system controller 17 loads audio data which is to undergo additional recording from the recording medium 200 based on the entry information, analyzes the loaded data to acquire header information, and holds the header information in the system memory 31. At this time, in step S1405 the system controller 17 calculates and determines the additional recording start position.

In step S1406, the system controller 17 stores audio data input from the microphone 10 in the memory 32 via the audio controller 11 and A/D converter 23 as in the audio recording processing. The data format in this processing assumes digital data in the PCM format described above.

Upon completion of storage of data for 1 sec, the system controller 17 starts additional recording processing of the audio data stored in the memory 32 to the recording medium 200 in step S1407 in parallel with to the audio recording processing. By repeating steps S1405 to S1407, audio data can be continuously additionally recorded.

Upon detection of an instruction for the end of additional recording via the control panel 25, the process advances from step S1408 to step S1409, and the system controller 17 executes the header generation processing to be described later with reference to FIG. 15. In step S1410, the system controller 17 generates the header field 1301 using the data generated in step S1409, appends it to the additionally recorded audio data, and writes the audio data in the recording medium 200 as an audio file. Furthermore, in step S1411 the system controller 17 generates directory entry information based on the date and time information acquired in step S1403, the file name acquired in step S1401, and the final file size. In step S1412, the system controller 17 writes the directory entry information in the recording medium 200, thus ending the audio additional recording processing.

<Header Generation Processing>

Figure 15:
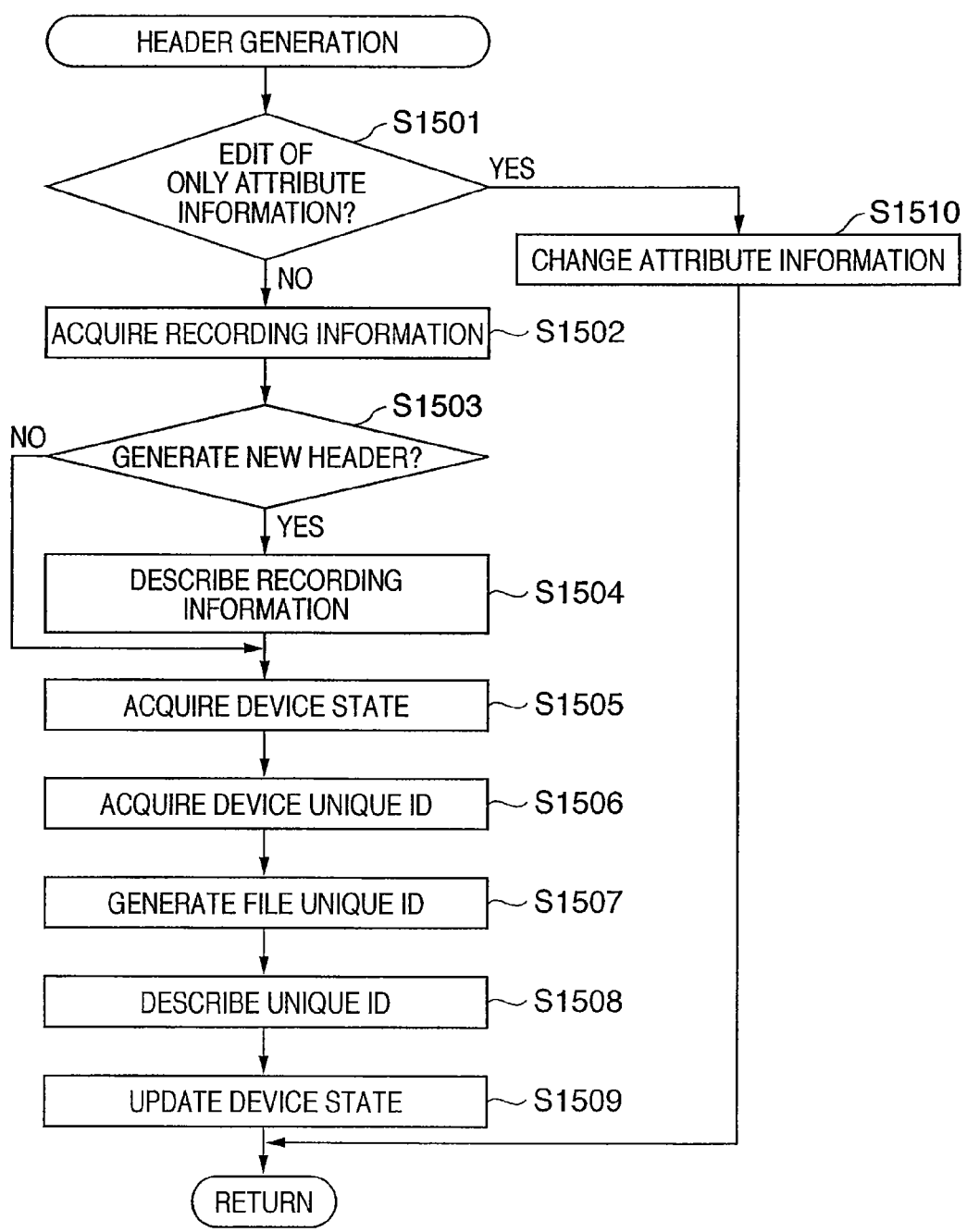
FIG. 15 is a flowchart showing a head generation processing sequence of the digital camera 100.
Figure 19:
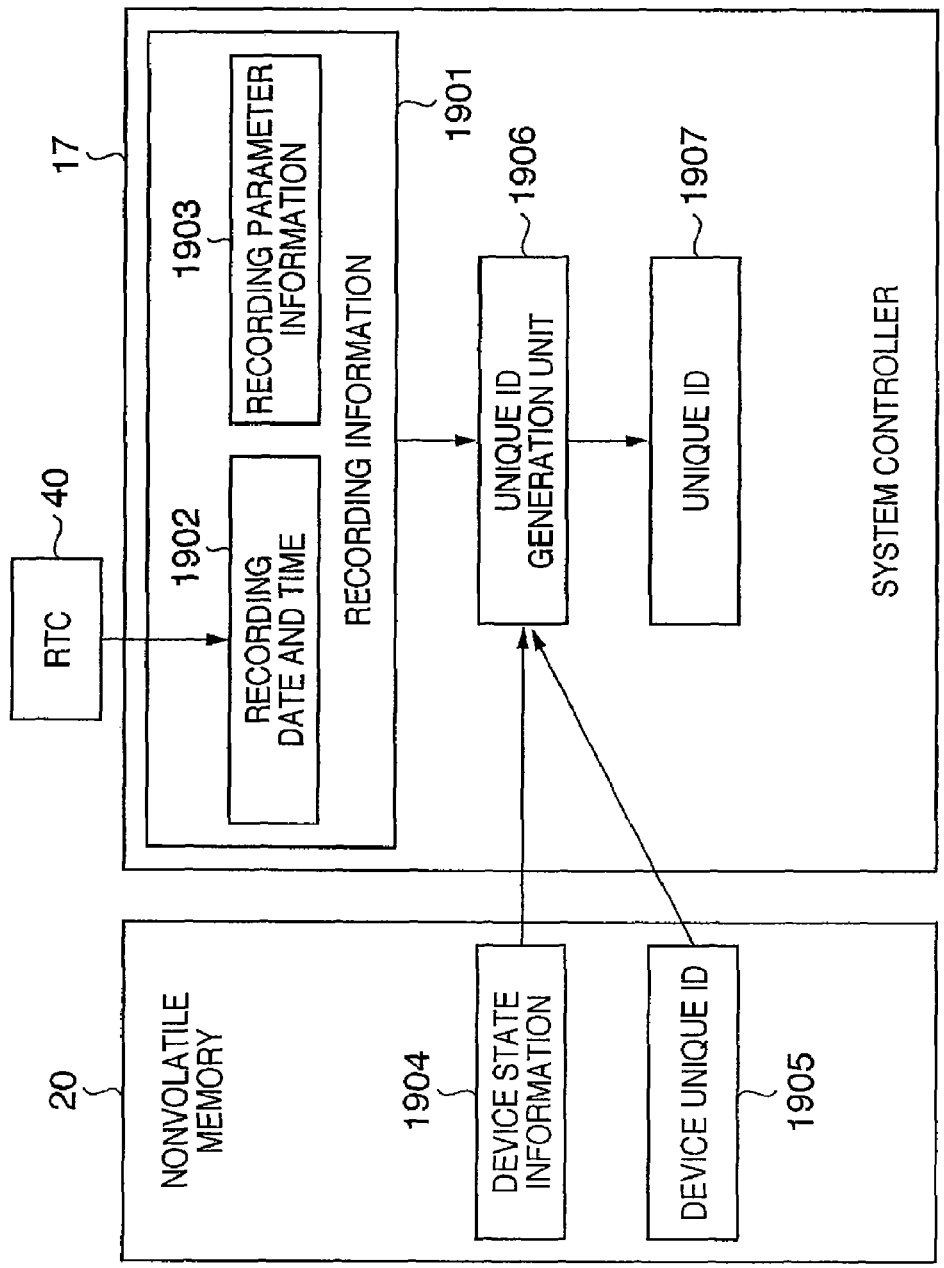
FIG. 19 is a block diagram showing an example of the functional arrangement for generating a unique ID in a system controller 17.

FIG. 15 is a flowchart for explaining the header generation processing according to this embodiment. FIG. 19 is a block diagram showing an example of the function arrangement required to generate a unique ID in the system controller 17. The header generation processing in step S311 in FIG. 3, step S905 in FIG. 9, step S1008 in FIG. 10, step S1206 in FIG. 12, and step S1409 in FIG. 14 will be described below with reference to FIGS. 15 and 19.

The system controller 17 checks in step S1501 if an operation to a file is an edit operation of a predetermined attribute (e.g., rotation attribute (Orientation) or the like) described in a predetermined header of the file. If that operation is an edit operation of a predetermined attribute (e.g., S905 in FIG. 9), the system controller 17 changes only the predetermined attribute to be edited in step S1510, thus ending this processing. That is, if there is no practical change for image data, the system controller 17 changes only the predetermined attribute to be edited to update the header, and obtains a header after the edit operation. In other words, upon making the edit operation for changing only attribute information described in the file header in association with the file recorded in the recording medium, unique identification information is inhibited from being updated.

On the other hand, if the operation to the file is not the edit operation of only information described in the header, for example, if the operation to the file is creation of a new file, or an edit operation for changing main body data (image data or audio data) in the file, the process advances from step S1501 to step S1502. In step S1502, the system controller 17 acquires recording information 1901. The recording information 1901 includes parameter information of shooting or audio recording such as a recording date and time 1902, recording parameter information 1903, and the like, which correspond to the file. Note that the recording date and time 1902 is a shooting date (shooting year, month, day) and shooting time (shooting hour, minute, second) generated based on the date and time acquired from the RTC 40. Also, the recording parameter information 1903 includes, for example, control information (f-number/shutter speed/exposure correction value/white balance information, etc.) upon shooting. That is, the recording information 1901 is associated with the generation condition of the recording data of interest independently of device state information 1904 to be described later.

The system controller 17 checks in step S1503 if a new header is to be generated. If a new header is to be generated, the system controller 17 generates a header by describing the acquired recording information in accordance with a predetermined format in step S1504. On the other hand, if the header has already been generated, since the recording information has already been described, the system controller 17 skips the processing in step S1504. Note that it is determined that a new header is to be generated when new image data is recorded (S311 in FIG. 3) or new audio data is recorded (S1206 in FIG. 12). Also, it is determined that the header has already been generated upon execution of the image edit operation for changing the size or the like (S1008 in FIG. 10) or upon additionally recording audio data (S1409 in FIG. 14).

In step S1505, the system controller 17 acquires device state information 1904 from the nonvolatile memory 20. The device state information 1904 is information which represents the states of device use such as a recording count (a shooting count for image data and an audio recording count for audio data), data generation count, data update count, shutter operation count, and the like, which are updated according to the use of the device. In step S1506, the system controller 17 acquires a device unique ID 1905 from the nonvolatile memory 20. The device unique ID is an ID such as a serial number upon manufacture, MAC address (Media Access Control address) of the device, or the like, which specifies the device. Note that the device unique ID 1905 may be stored in a ROM (not shown) or the like. In step S1507, a unique ID generation unit 1906 generates a file unique ID 1907 based on the recording information 1901, device state information 1904, and device unique ID 1905, which are acquired in steps S1502, S1505, and S1506. In step S1508, the system controller 17 describes the file unique ID 1907 at a predetermined location of the header (Unique ID 418). Note that the file unique ID 1907 may be generated by enumerating the recording information, device state information, and device unique ID, or by arithmetic operations of the respective pieces of information. In step S1509, the system controller 17 updates the acquired and used device state information, and stores the updated information in the nonvolatile memory 20, thus ending this processing.

In the above example, the device state information is updated at the header generation timing. As the holding/update timing of the device state information, the system controller 17 stores information read out from the nonvolatile memory 20 upon startup in the system memory 31. The system controller 17 increments by one the device state information stored in the system memory 31 at the header generation timing, and writes out the device state information stored in the system memory 31 to the nonvolatile memory 20 upon system shutdown. Of course, the system controller 17 may write out the device state information to the nonvolatile memory 20 every time it updates the information.

When the device state information includes a shutter count, it is updated every time an image is shot. Using this information, an ID unique to an image file can be generated. When the device state information includes a recording count, it can be updated every time data is generated and recorded in the recording medium. For this reason, a file unique ID can be generated not only for an image file but also for a file such as an audio file or the like, which can be recorded irrespective of shutter control. When the device state information includes a data generation count, it is updated not only when data is generated and recorded in the recording medium but also when the generated data is transmitted to another device such as a PC or the like without being recorded in the recording medium. When the device state information includes a data update count, it can be updated when the generated data is partially changed, or when the data is added or deleted. Hence, a unique file ID can be generated. Note that a combination of two or more types of device state information may be used.

As described above, according to this embodiment, a unique file ID can be appended to data to be recorded throughout a plurality of devices, a plurality of recording media, and a plurality of data. Since the unique ID is generated using the recording information, device state information, and device unique ID, ID generation can be sped up.

According to this embodiment, when a data file is transferred from an external device, no new unique file ID is assigned to that file. For this reason, identical data can be prevented from being transferred a plurality of times with a host that manages the reception state of data files recorded in the external device using unique device IDs. Upon editing the header, since a new unique device ID is not assigned, generation of an unwanted unique ID due to a simple change in attribute such as a change in rotation information or the like can be prevented. When the contents of data are changed, since a unique file ID is issued again, data management using the unique file IDs can be easily made with high reliability.

Second Embodiment

In the first embodiment, still image recording and audio recording have been described. The digital camera 100 can also make moving image recording in addition to the still image recording. The moving image recording can be executed by selecting the moving image recording mode by the mode select button 27. The operation of the digital camera 100 in the moving image recording mode will be described below.

Upon detection of the ON second shutter switch signal SW2 in the moving image recording mode, the system controller 17 sequentially stores image data captured by the image sensing unit 22 in the memory 32 at a predetermined frame rate. At the same time, the system controller 17 stores an audio signal captured from the microphone 10 in the memory 32 via the audio controller 11 and A/D converter 23.

The moving image mode processing according to the second embodiment will be described below with reference to FIG. 16. This processing is executed when the moving image mode is determined in, for example, step S203 of FIG. 2.

Figure 16:
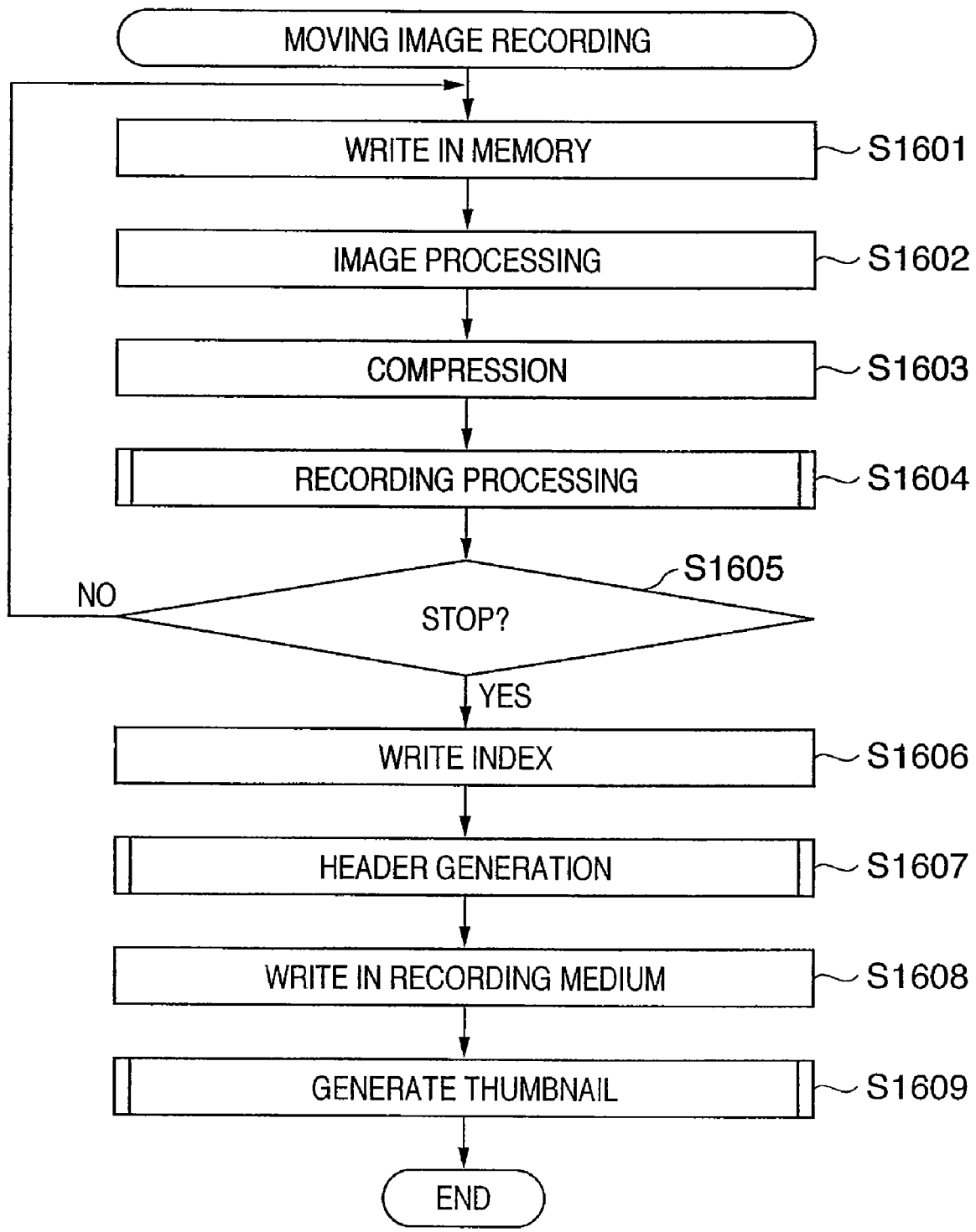
FIG. 16 is a flowchart showing a moving image recording sequence of the digital camera 100.

Upon detection of the ON second shutter switch signal SW2 in the moving image recording mode, the system controller 17 starts the moving image recording processing shown in FIG. 16. In step S1601, the system controller 17 sequentially stores image data captured by the image sensing unit 22 in the memory 32 at a predetermined frame rate. At the same time, the system controller 17 stores an audio signal captured from the microphone 10 in the memory 32 via the audio controller 11 and A/D converter 23. The second embodiment assumes digital data in a PCM format as audio data. In step S1602, the system controller 17 executes image processing for, for example, converting the image data stored in the memory 32 into an image size to be recorded in a moving image file. In step S1603, the system controller 17 applies compression processing to the image data, and stores the compressed image data in the memory 32.

Figure 17:
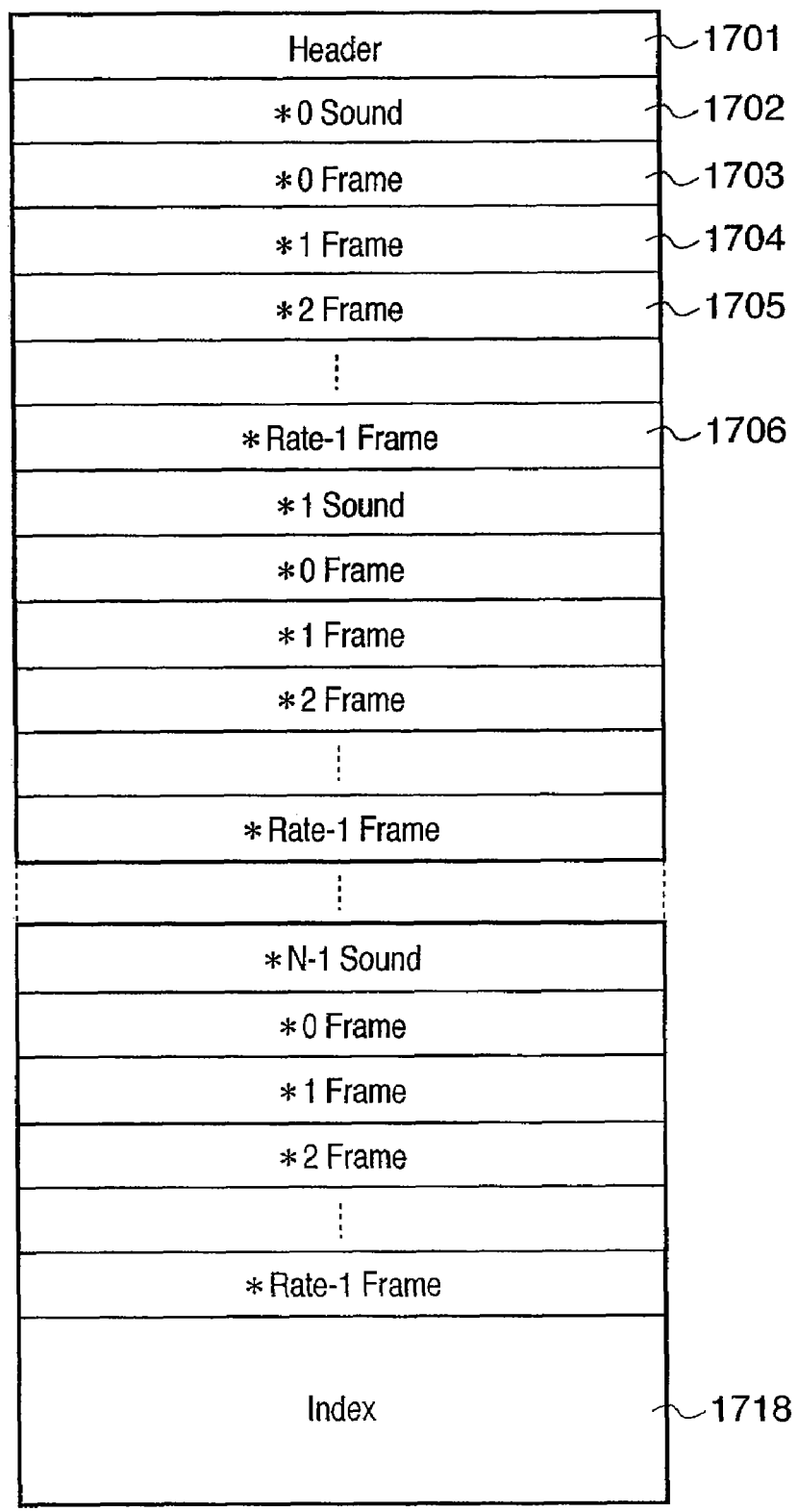
FIG. 17 shows an example of the configuration of a moving image file recorded in the recording medium 200.

FIG. 17 shows the storage format of a moving image file to be recorded in the recording medium 200. At the head position of data, a fixed-length header field 1701 which includes data such as a video frame rate, audio sampling rate, and the like is allocated. Immediately after the header field 1701, a fixed-length audio data field 1702 that stores audio data for 1 sec is allocated. Audio data input from the microphone 10 is sampled to digital data via the audio controller 11 and A/D converter 23, and the digital data is stored in the memory 32. Immediately after the audio field 1702, frame data recorded at the predetermined frame rate are sequentially stored in the memory 32 (data 1703 to 1706) to generate sequential data in increments of 1 sec.

Upon completion of storage of data for 1 sec, in step S1604 the system controller 17 starts processing for recording moving image data stored in the memory 32 in the recording medium 200 in parallel with to the recording processing of the moving image data and audio data. Note that the recording processing in step S1604 will be described later. The system controller 17 repeats these processes (S1601 to S1604) until it detects a moving image stop request in step S1605. Upon re-detection of the second shutter switch signal SW2, detection of exhaustion of the free capacity of the recording medium 200, or detection of exhaustion of the free space of the memory 32, a moving image stop request is generated.

The configuration of the directories recorded in the recording medium 200 by the recording processing is as has been described above using FIG. 5. Under the root directory, the DCIM directory 501 is recorded, and subdirectories each having a name generated using eight characters are generated under the DCIM directory 501. The name held by each subdirectory includes first three characters as a numeric part starting from 100, and a subdirectory name is assigned whose numeric part is incremented by one every time a new subdirectory is generated (e.g., subdirectories 502 and 503 in FIG. 5). Under the subdirectory 502, various files (e.g., files 511 to 518 in FIG. 5) generated by the digital camera 100 of the second embodiment are generated. The file name to be generated includes a file name of eight characters, and an extension of three letters indicating the type of file. Of the file name, the last four characters are a numeral starting from 0001, and the numeral is incremented by one for each shooting, thus assigning a file name in the still image recording mode. Note that "JPG" is assigned to an extension of a still image. Also, "AVI" is assigned to that of a moving image recorded in the moving image mode (e.g., files 515 and 517), and "THM" is assigned to that of a thumbnail file that records management information (e.g., files 516 and 518). Note that the thumbnail is generated in step S1609 to be described later.

The recording processing (step S1604) of the second embodiment is similar to that of the first embodiment. Therefore, the recording processing of the second embodiment will be described below using FIG. 6. When the recording processing starts, in step S601 the system controller 17 generates a file name. In this case, the system controller 17 generates a file name, for example, MVI_0005.AVI since the moving image recording mode is selected. The system controller 17 acquires from the system memory 31 the date and time at the beginning of recording in step S602, and acquires the write size in step S603. Note that, the date and time at the beginning of recording have been obtained from the system timer and stored in the system memory 31 in the step S1601. The time at the beginning of recording is also referred to as the shooting date and time.

Upon execution of the first write process (i.e., the write process of data including the header field 1701), the system controller 17 checks the presence/absence of a directory that stores the generated file in step S604. If the corresponding directory is not found, the system controller 17 generates a directory in step S605, and the process advances to step S606. On the other hand, if the corresponding directory is found, the process jumps from step S604 to step S606. The system controller 17 generates a directory entry in that directory in step S606, and writes data in the recording medium 200 in step S607. In the second and subsequent write processes, since the problem of the directory has already been solved, the system controller 17 writes data in the directory in which the data is written in the first write process.

When the moving image recording processing stops, the process advances from step S1605 to step S1606. In step S1606, the system controller 17 writes remaining moving image data in the memory 32, and records index information 1718 that stores offsets to respective audio data/video data and sizes. In step S1607, the system controller 17 generates header information including the total number of frames and the like. In step S1608, the system controller 17 describes the total data size in the directory entry, and records that information in the recording medium 200, thus completing recording of the moving image file. In step S1609, the system controller 17 generates management information of the moving image file as a file MVI_0005.THM (directory entry 714) having the same number as the above moving image file name.

The thumbnail file generated in this step has the same structure as the image data file shown in FIG. 4. That is, thumbnail data has a marker SOI 402 indicating the start of the image at the head of the file. The thumbnail data has an application marker (APP1) 403 after the SOI 402. The application marker 403 includes:

APP1 Length 404 indicating the size of APP1;
APP1 Identifier Code 405 indicating an identification code of APP1;
Date Time 406 indicating the generation date and time of image data;
Date Time Original 407 indicating the generation date and time of original image data; and
Etc 408 as miscellaneous shooting information.

Note that the thumbnail file does not include any thumbnail image Thumbnail Data 410.

Upon generating thumbnail data in step S1609, the system controller 17 stores the shooting date and time information stored in the system memory 31 in the aforementioned Date Time 406 and Date Time Original 407. Note that the shooting date and time information is stored in the system memory 31 in step S1601.

The thumbnail image is a reduced-scale image of the first frame at the beginning of moving image recording, and includes a quantization table DQT 412, Huffman table DHT 413, frame start marker SOF 414, scan start marker SOS 415, and compressed data 416 (compressed data of the thumbnail image). The thumbnail image is terminated by a marker EOI 417 indicating the end of image data.

The thumbnail generation processing in step S1609 will be described below. Upon starting the thumbnail generation, the system controller 17 applies image processing for, for example, converting the first frame stored in the memory 32 to a predetermined image size. The system controller 17 executes compression processing using the compression/decompression unit 16, generates a header including the application marker 403 described above, and writes data in the recording medium. After the thumbnail file is generated in this way, the system controller 17 ends the moving image recording processing in FIG. 16.

Figure 18:
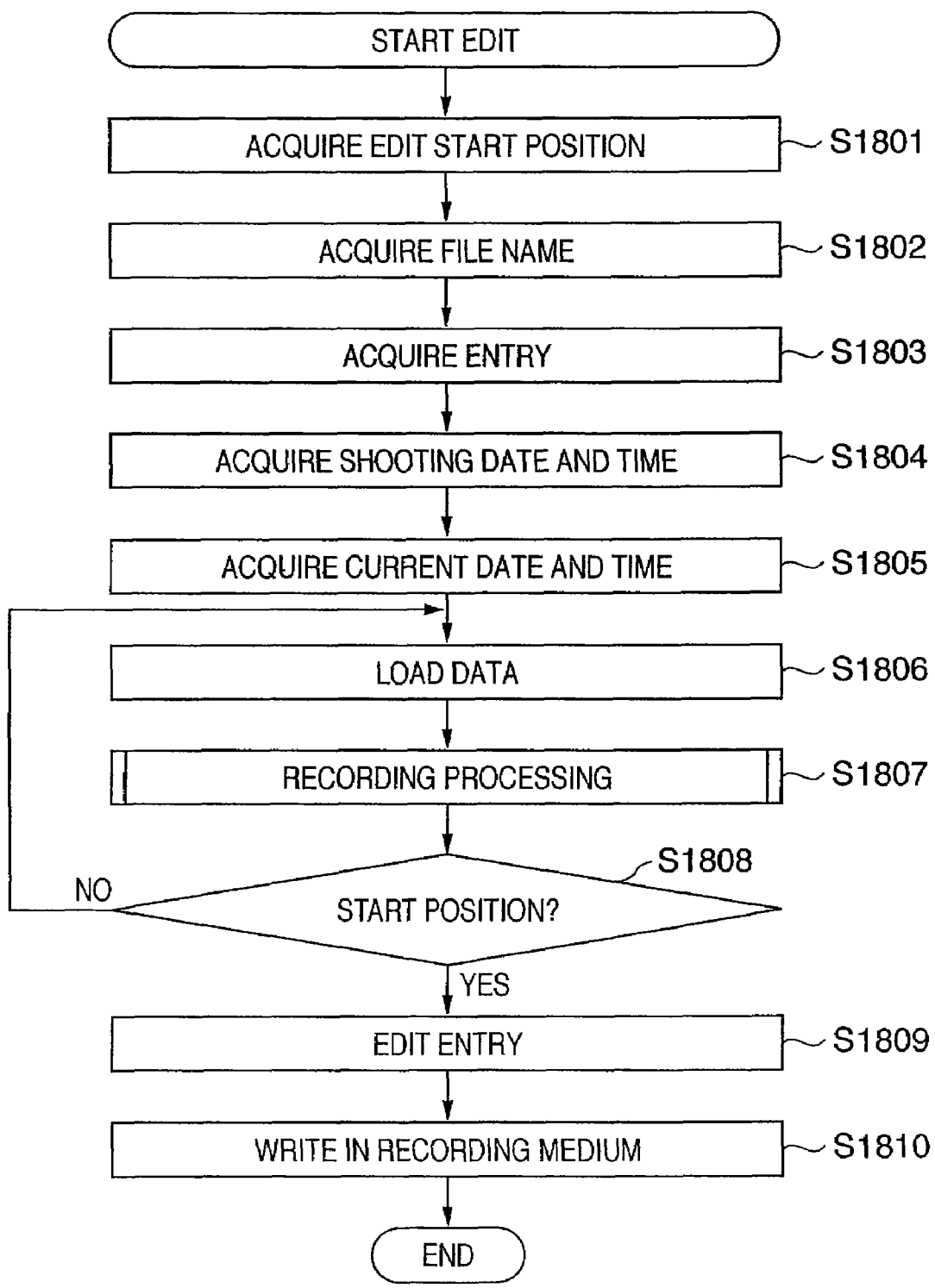
FIG. 18 is a flowchart showing a moving image edit sequence of the digital camera 100.

The moving image data generated by the above processing can undergo clipping edit processing after a predetermined frame by the digital camera 100 of this embodiment. A description about storage of a new file of moving image data obtained by applying backward clipping edit processing to the file MVI_0005.AVI (directory entry 713) will be given using FIG. 18.

Upon starting the edit processing, in step S1801 the system controller 17 acquires the clipping start position in the moving image selected by the arrow buttons of the control panel 25, and settles the clipping start position in the moving image file shown in FIG. 17 based on the selected frame. Next, in step S1802 the system controller 17 acquires the file name of an original moving image file to be edited. In this case, assume that the file name to be acquired is MVI_0005.AVI. In step S1803, the system controller 17 acquires the corresponding directory entry (e.g., directory entry 713 in FIG. 7). In step S1804, the system controller 17 acquires the contents of the generation date and time field 703 in the acquired directory entry, that records the shooting date and time, and holds it in the system memory 31. In step S1805, the system controller 17 acquires the current date and time from the system timer as the edit start timing and stores it in the system memory 31. Subsequently, the system controller 17 loads moving image data from the recording medium 200 onto the memory 32 in step S1806, and records the loaded data in a new file in step S1807. The recording sequence in this case is that shown in FIG. 6.

That is, the system controller 17 generates a new file name (MVI_0006.AVI in this case) in step S601, acquires the date and time at the beginning of recording (the edit start timing) from the system memory 31 in step S602, and acquires the write size in step S603. Upon execution of the first write process (i.e., the write process of data including the header field 1701), the system controller 17 checks in step S604 if a directory that stores the generated file exists. If the directory is not found, the process advances to step S605 to generate a directory, and the process advances to step S606. On the other hand, if it is determined in step S604 that the directory that stores the generated file is found, the process jumps to step S606. The system controller 17 generates a directory entry (directory entry 715) in that directory in step S606, and writes data in the recording medium 200 in step S607.

Subsequently, the system controller 17 checks in step S1808 if the data loaded in step S1805 includes the edit start position stored in the system memory 31 in step S1801. The loading processing (step S1806) and recording processing (step S1807) are continued until it is determined in step S1808 that the edit start position is included. If data including the edit start position is loaded in step S1806, the system controller 17 records moving image data immediately before the edit position in the recording medium 200 and records index data accordingly in the recording processing in step S1807. Upon completion of recording of moving image data, in step S1809 the system controller 17 edits the contents of the generation date and time field 703 in the directory entry 715 based on the shooting date and time information of the original moving image data stored in the system memory 31 in step S1804. The system controller 17 then writes it in the recording medium 200, thus ending the moving image edit processing in step S1810.

Upon completion of the above processing, the system controller 17 can generate management information of the moving image file in another file MVI_0006.THM. This file has the same structure as in FIG. 4 described above, and thumbnail data of the first frame 1703 of the moving image data is recorded as compressed data. Data based on the date and time acquired in step S1805 is set in the Date Time 406 in the header as the date and time of the edit start timing. The date and time of the moving image recording start timing acquired in step S1804 are described in the Date Time Original 407. The recording processing of a thumbnail file 716 as such management file is as has already been described above using FIG. 6, and the generation date and time and update date and time stored in the directory entry are the date and time of the moving image recording start timing and the edit start timing respectively.

When acquiring the shooting date and time of the original image in step S1804, it is often apparently determined that the shooting dates and times are not correctly set (e.g., "0" is set in the generation date and time fields of the directory entries).

In such a case, the system controller 17 may acquire the contents of the update date and time field 704 in the directory entry of the original image.

As in the first embodiment, the system controller 17 may use the Date Time Original 407 described in the file header of the original image for the shooting date and time.

As described above, according to the first and second embodiments, unique file IDs can be assigned to still image files, moving image files, and audio data files.

Application to the digital camera has been explained. However, the present invention can be applied to any device such as a mobile phone and the like which have a data playback function.

As described above, according to the present invention, unique identification information that does not cause any duplication can be assigned to data files.

According to the present invention, upon managing the reception state of data files using unique file IDs, efficient management with high reliability can be implemented.

Note that the present invention includes a case wherein the functions of the embodiments are achieved by directly or remotely supplying a software program to a system or apparatus, and reading out and executing the supplied program code by a computer of that system or apparatus. The program to be supplied in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a recording medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the user establishes a connection to a home page on the Internet using a browser on a client computer, and downloads the computer program of the present invention from the home page onto a recording medium such as a hard disk or the like. In this case, the program to be downloaded may be a compressed file including an automatic installation function. Also, the program code that forms the program of the present invention may be segmented into a plurality of files, which may be downloaded from different home pages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a home page via the Internet. The user executes the encrypted program using the downloaded key information to install the program on a computer.

The functions of the aforementioned embodiments can be implemented when the computer executes the readout program. Furthermore, the functions of the aforementioned embodiments can be implemented in collaboration with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the recording medium is written in a memory equipped on a function expansion board or a function expansion unit, which is inserted into or connected to the computer. In this case, after the program is written in the function expansion board or unit, a CPU equipped on the function expansion board or function expansion unit executes some or all of actual processes based on an instruction of that program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-227021, filed Aug. 23, 2006, and Japanese Patent Application No. 2006-227022, filed Aug. 23, 2006, which are hereby incorporated by reference herein in their entirety.

What is claimed is:

1. A data processing apparatus comprising:

holding unit configured to hold device state information which is updated according to use of the data processing apparatus and represents a use state of the apparatus, and device identification information unique to the apparatus;

acquiring unit configured to acquire information associated with generation of recording data, which is different from the device state information, as recording information, in association with the recording data;

generating unit configured to generate unique identification information of the recording data based on the device identification information, the device state information, and the recording information;

recording unit configured to record a file including the recording data and the unique identification information generated by the generating unit in a recording medium; and updating unit configured to make, when contents of the recording data are changed in association with the file stored in the recording medium, the generating unit generate new unique identification information, and to record a file including the changed recording data and the new unique identification information in the recording medium, wherein when an edit operation for changing only attribute information described in a header of the file recorded in the recording medium is performed, updating of unique identification information by the updating unit is inhibited.

2. The apparatus according to claim 1, wherein the edit operation that updates only the attribute information described in the header is rotation processing of an image.

3. A method of controlling a data processing apparatus, comprising:

a holding step of holding device state information which is updated according to use of the data processing apparatus and represents a use state of the apparatus, and device identification information unique to the apparatus;

an acquiring step of acquiring information associated with generation of recording data, which is different from the device state information, as recording information, in association with the recording data;

a generating step of generating unique identification information of the recording data based on the device identification information, the device state information, and the recording information;

a recording step of recording a file including the recording data and the unique identification information generated in the generating step in a recording medium; and an updating step of making, when contents of the recording data are changed in association with the file stored in the recording medium, the generating step include generation of new unique identification information, and recording a file including the changed recording data and the new unique identification information in the recording medium, wherein when an edit operation for changing only attribute information described in a header of the file recorded in the recording medium is performed, updating of unique identification information in the updating step is inhibited.

4. The method according to claim 3, wherein the edit operation that updates only the attribute information described in the header is rotation processing of an image.

5. A computer-readable storage medium storing a control program which, when run on a device, performs a control method according to claim 3.

* * * * *